United States Patent
Yamamoto

(10) Patent No.: US 10,942,409 B2
(45) Date of Patent: Mar. 9, 2021

(54) ACTIVE-MATRIX SUBSTRATE AND DISPLAY DEVICE

(71) Applicant: Sharp Kabushiki Kaisha, Sakai (JP)

(72) Inventor: Kaoru Yamamoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 168 days.

(21) Appl. No.: 16/329,240

(22) PCT Filed: Aug. 28, 2017

(86) PCT No.: PCT/JP2017/030780
§ 371 (c)(1),
(2) Date: Feb. 28, 2019

(87) PCT Pub. No.: WO2018/043424
PCT Pub. Date: Mar. 8, 2018

(65) Prior Publication Data
US 2019/0250448 A1     Aug. 15, 2019

(30) Foreign Application Priority Data
Sep. 1, 2016  (JP) .............................. JP2016-170832

(51) Int. Cl.
*G02F 1/1368*     (2006.01)

(52) U.S. Cl.
CPC ...... *G02F 1/1368* (2013.01); *G02F 2202/104* (2013.01); *G09G 2300/0408* (2013.01); *G09G 2310/0286* (2013.01); *G09G 2310/0289* (2013.01); *G09G 2310/0291* (2013.01)

(58) Field of Classification Search
None
See application file for complete search history.

(56) References Cited

U.S. PATENT DOCUMENTS

| | | |
|---|---|---|
| 5,942,856 A | 8/1999 | Koyama |
| 6,392,627 B1 | 5/2002 | Maekawa |
| 2005/0231238 A1* | 10/2005 | Chang ............ H03K 19/018571 326/81 |

(Continued)

FOREIGN PATENT DOCUMENTS

| | | |
|---|---|---|
| CN | 102637745 A | 8/2012 |
| CN | 103457598 A | 12/2013 |

(Continued)

OTHER PUBLICATIONS

Official Communication issued in International Patent Application No. PCT/JP2017/030780, dated Nov. 28, 2017.

*Primary Examiner* — Phu Vu
(74) *Attorney, Agent, or Firm* — Keating & Bennett, LLP

(57) ABSTRACT

Provided is an active matrix substrate (100) that includes multiple pixel TFTs (10), multiple gate wiring lines (GL) along which a scanning signal is supplied to the multiple pixel TFTs, multiple source wiring lines (SL) along which a display signal is supplied to the multiple pixel TFTs, a gate driver (20) that drives multiple gate wiring lines, and a source driver (30) that drives multiple source wiring lines. At least one of the gate driver and the source driver includes a current mirror circuit (70). The current mirror circuit is configured with two oxide semiconductor TFTs (71c and 72c) each of which includes an oxide semiconductor layer.

20 Claims, 10 Drawing Sheets

(56) References Cited

U.S. PATENT DOCUMENTS

| | | | |
|---|---|---|---|
| 2008/0024416 A1 | 1/2008 | Onogi et al. | |
| 2009/0323005 A1 | 12/2009 | Ota | |
| 2012/0138922 A1 | 6/2012 | Yamamzaki et al. | |
| 2012/0194772 A1* | 8/2012 | Moriwaki | G02F 1/1339 349/138 |
| 2012/0205648 A1 | 8/2012 | Yokozeki | |
| 2013/0320956 A1 | 12/2013 | Pang | |
| 2014/0306219 A1 | 10/2014 | Yamazaki et al. | |
| 2015/0108467 A1 | 4/2015 | Moriguchi et al. | |
| 2015/0179448 A1* | 6/2015 | Lee | H01L 21/02667 438/104 |
| 2015/0255492 A1 | 9/2015 | Takahashi et al. | |
| 2015/0293546 A1 | 10/2015 | Tanaka et al. | |
| 2017/0004799 A1* | 1/2017 | Park | G09G 3/3688 |

FOREIGN PATENT DOCUMENTS

| | | |
|---|---|---|
| JP | 10-197896 A | 7/1998 |
| JP | 11-242204 A | 9/1999 |
| JP | 2006-208498 A | 8/2006 |
| JP | 2008-32899 A | 2/2008 |
| JP | 2010-8758 A | 1/2010 |
| JP | 2012-134475 A | 7/2012 |
| JP | 2014-220492 A | 11/2014 |
| JP | 2015-181227 A | 10/2015 |
| WO | 2012/086513 A1 | 6/2012 |
| WO | 2014/069529 A1 | 5/2014 |

\* cited by examiner (a)

(b)

(c)                (d)

ACTIVE-MATRIX SUBSTRATE AND DISPLAY DEVICE

TECHNICAL FIELD

The present invention relates to an active matrix substrate and a display device.

BACKGROUND ART

An active matrix substrate that is used in a liquid crystal display device or the like includes a Thin Film Transistor (hereinafter referred to as "TFT") as a switching element for every pixel. As the TFT, a TFT of which an activation layer is an amorphous silicon film (hereinafter referred to as "amorphous silicon TFT"), or a TFT of which an activation layer is a polycrystalline silicon film (hereinafter referred to as "polycrystalline silicon TFT") is widely used.

Generally, the active matrix substrate has a display area and a non-display area. The display area includes multiple pixels (a pixel area) that are arranged in matrix form, and is also referred to as an active area. The non-display area is positioned in the vicinity of the display area, and is also referred to as a frame area or a peripheral area.

Provided in the display area is a TFT that is formed in every pixel, a gate wiring line, a source wiring line, and a pixel electrode of the TFT that are electrically connected to a gate electrode, a source electrode, and a drain electrode, respectively, or the like. The TFT is covered with an inter-layer insulating layer, and the pixel electrode is formed on the inter-layer insulating layer.

Arranged in the non-display area is a drive circuit such as a gate driver or a source driver. The drive circuit is mounted as a semiconductor chip (Chip On Glass (COG) mounting) in some cases and is monolithically (integrally) formed in the active matrix substrate in other cases. The drive circuit that is monolithically formed is referred to as "monolithic driver". The monolithic driver is normally configured using the TFT. In recent years, technologies that manufacture the monolithic driver using a polycrystalline silicon TFT have been used. Accordingly, cost reduction can be realized by narrowing down the frame area or simplifying a mounting process.

However, in some cases, the polycrystalline silicon TFT varies greatly in its element characteristic, and neighboring TFTs vary in their element characteristics as well. The reason for this is that crystalline interfaces which are present in polycrystalline silicon are not equally formed on a substrate. The crystalline interface of the polycrystalline silicon variously changes according to its position or the like within the substrate.

This variation in the element characteristic in the polycrystalline silicon TFT causes a decrease in performance of the monolithic driver. For example, in some cases, a current mirror circuit that generates and outputs electric current having a given magnitude (for example, having the same magnitude as reference electric current) based on input electric current (the reference electric current) is included in the gate driver or the source driver. When multiple TFTs that constitute the current mirror circuit vary in their element characteristics, a magnitude of electric current that is input deviates from a desired value, and the precision of output of the current mirror circuit decreases.

In PTL 1, the source driver that includes the current mirror circuit is disclosed. In the source driver in PTL 1, connection portions of a buffer circuit and a bias circuit that supplies a bias voltage to the buffer circuit are configured with the current mirror circuit that includes multiple polycrystalline silicon TFTs. In FIG. 9 in PTL 1, a state is illustrated where the current mirror circuit is configured with 8 NMOS transistors (polycrystalline silicon TFTs) that are connected in parallel. In this state, although a variation occurs in a threshold voltage of the TFT, bias electric current can be uniform. This is because electric current can be supplied through any other TFT, for example, although a threshold voltage of a certain TFT among the TFTs that constitute the current mirror circuit is higher than that of any other TFT.

CITATION LIST

Patent Literature

PTL 1: Japanese Unexamined Patent Application Publication No. 2006-208498

SUMMARY OF INVENTION

Technical Problem

However, in the state that is illustrated in FIG. 9 in PTL 1, the precision of output is increased by increasing the number of TFTs that constitute the current mirror circuit, and because of this, the number of circuit elements increases. The increase in the number of circuit elements causes an increase in an amount of consumption electric current or a decrease in a yield.

An object of the present invention, which was made in view of the problem described above, is to improve the precision of output of a current mirror circuit that a drive circuit in an active matrix substrate has, while suppressing an increase in the number of circuit elements.

Solution to Problem

According to an embodiment of the present invention, there is provided an active matrix substrate that has a display area which includes multiple pixel areas and a non-display area which is positioned in the vicinity of the display area, the substrate including: a substrate; multiple pixel TFTs that are arranged in the multiple pixel areas, the multiple pixel TFTs being supported on the substrate; multiple gate wiring lines along which a scanning signal is supplied to the multiple pixel TFTs; multiple source wiring lines along which a display signal is supplied to the multiple pixel TFTs; a gate driver that drives the multiple gate wiring lines; and a source driver that drives the multiple source wiring lines, in which at least one of the gate driver and the source driver includes a current mirror circuit, and in which the current mirror circuit is configured with two oxide semiconductor TFTs each of which includes an oxide semiconductor layer.

In a certain embodiment, each of the two oxide semiconductor TFTs is an NMOS transistor.

In a certain embodiment, the gate driver includes the current mirror circuit.

In a certain embodiment, the gate driver includes a shift register circuit, a level shifter circuit, and an output buffer circuit, and the level shifter circuit includes the current mirror circuit.

In a certain embodiment, each of the shift register circuit and the output buffer circuit includes multiple TFTs, the level shifter circuit includes multiple PMOS transistors and multiple NMOS transistors, each of the multiple TFTs of the shift register circuit and each of the multiple PMOS transistors of the level shifter circuit are polycrystalline silicon TFTs each of which includes a polycrystalline silicon semiconductor layer, and each of the multiple NMOS transistors of the level shifter circuit and each of the multiple TFTs of the output buffer circuit are oxide semiconductor TFTs each of which includes an oxide semiconductor layer.

In a certain embodiment, the gate driver includes multiple PMOS transistors and multiple NMOS transistors, each of the multiple PMOS transistors is a polycrystalline silicon TFT that includes a polycrystalline silicon semiconductor layer, and each of the multiple NMOS transistors is an oxide semiconductor TFT that includes an oxide semiconductor layer.

In a certain embodiment, the gate driver is monolithically formed on the substrate.

In a certain embodiment, the source driver includes the current mirror circuit.

In a certain embodiment, the source driver includes a buffer unit that includes a bias circuit and an output buffer circuit, and the buffer unit includes the current mirror circuit.

In a certain embodiment, the buffer unit includes multiple PMOS transistors and multiple NMOS transistors, each of the multiple PMOS transistors is a polycrystalline silicon TFT that includes a polycrystalline silicon semiconductor layer, and each of the multiple NMOS transistors is an oxide semiconductor TFT that includes an oxide semiconductor layer.

In a certain embodiment, the source driver is monolithically formed on the substrate.

In a certain embodiment, each of the multiple pixel TFTs is an oxide semiconductor TFT that includes an oxide semiconductor layer.

In a certain embodiment, the oxide semiconductor layer contains an In—Ga—Zn—O-based semiconductor.

In a certain embodiment, the In—Ga—Zn—O-based semiconductor includes a crystalline portion.

According to another embodiment of the present invention, there is provided a display device including: the active matrix substrate; an opposite substrate that is positioned in such a manner as to face the active matrix substrate; and a display medium layer that is provided between the active matrix substrate and the opposite substrate.

Advantageous Effects of Invention

According to the embodiment of the present invention, the precision of the output of the current mirror circuit that the drive circuit in the active matrix substrate has can be improved while suppressing the increase in the number of circuit elements.

DESCRIPTION OF EMBODIMENTS

An active matrix substrate according to an embodiment of the present invention will be described below. The active matrix substrates according to the embodiment of the present invention are widely used as various display devices and electronic apparatuses. It is noted that the present invention is not limited to the following embodiment.

(Current Mirror Circuit)

Figure 1:
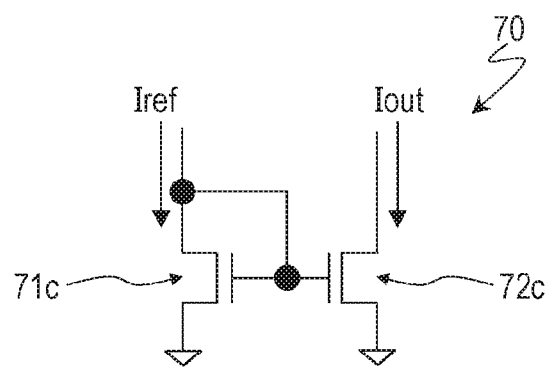
FIG. 1 is a circuit diagram illustrating a current mirror circuit 70 in which a gate driver and/or a source driver in an active matrix substrate is included, according to an embodiment of the present invention.

In the active matrix substrate according to the embodiment of the present invention, at least one of a gate driver and a source driver includes a current mirror circuit. A current mirror circuit 70 according to the embodiment of the present invention is described with reference to FIG. 1. FIG. 1 is a circuit diagram illustrating the current mirror circuit 70.

The current mirror circuit 70, as illustrated in FIG. 1, is configured with two TFTs, TFT 71c and 72c (hereinafter referred to "first TFT" and "second TFT", respectively). Each of the first TFT 71c and the second TFT 72c here is an NMOS transistor. A drain electrode and a gate electrode of the first TFT 71c and a gate electrode of the second TFT 72c are connected to a constant electric current source that supplies reference electric current $I_{ref}$. The current mirror circuit 70 outputs output electric current $I_{out}$ having a given magnitude based on the reference electric current $I_{ref}$. The current mirror circuit 70 here outputs the output electric current $I_{out}$ that is substantially the same as the reference electric current $I_{ref}$.

Each of the first TFT 71c and the second TFT 72c that constitute the current mirror circuit 70 is an oxide semiconductor TFT. More precisely, each of the first TFT 71c and the second TFT 72c includes an oxide semiconductor layer as an activation layer.

The current mirror circuit 70 is configured with two oxide semiconductor TFTs (the first TFT 71c and the second TFT 72c), and thus the precision of output of the current mirror circuit 70 can be improved. The reason for this will be described below through comparison with the current mirror circuit that is a comparative example.

Figure 2:
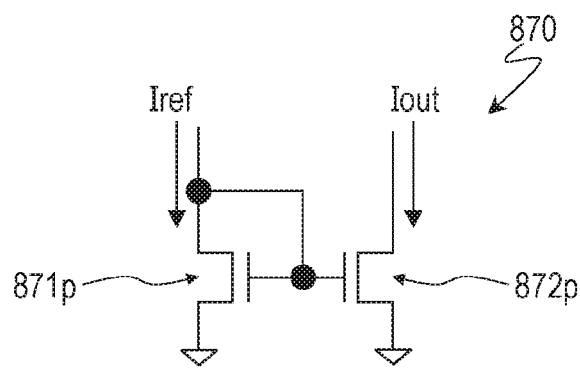
FIG. 2 is a circuit diagram illustrating a current mirror circuit 870 that is a comparative example.

FIG. 2 illustrates a current mirror circuit 870 that is a comparative example. The current mirror circuit 870 that is the comparative example which is illustrated in FIG. 2 is configured with two TFTs, TFTs 871p and 872p (hereinafter referred to as "first TFT" and "second TFT", respectively). Each of the first TFT 871p and the second TFT 872p is an NMOS transistor. A drain electrode and a gate electrode of the first TFT 871p and a gate electrode of the second TFT 872p are connected to the constant electric current source that supplies the reference electric current $I_{ref}$. The current mirror circuit 870 also outputs the output electric current $I_{out}$ having a given magnitude based on the reference electric current $I_{ref}$.

However, each of the first TFT 871p and the second TFT 872p that constitute the current mirror circuit 870 is a polycrystalline silicon TFT. More precisely, each of the first TFT 871p and the second TFT 872p includes a polycrystalline silicon semiconductor layer as the activation layer.

The reference electric current $I_{ref}$ and the output electric current $I_{out}$ in each of the current mirror circuits 70 and 870 are expressed in following Equations (1) and (2), respectively. $\mu_1$, $C_{ox1}$, $W_1$, $L_1$, $V_{gs}$, and $V_{th1}$ in Equation (1) are channel electron mobility (hereinafter referred to simply as "mobility"), gate insulating film capacity per unit area, a channel width, a channel length, a voltage between a gate and a source, and a threshold voltage, respectively, in the first TFTs 71c and 871p. In the same manner, $\mu_2$, $C_{ox2}$, $W_2$, $L_2$, $V_{gs}$, and $V_{th2}$ in Equation (2) are electron mobility, gate insulating film capacity per unit area, a channel width, a channel length, a voltage between a gate and a source, and a threshold voltage, respectively, in the second TFTs 72c and 872p, respectively.

[Math. 1]
$$I_{ref} = \frac{1}{2}\mu_1 C_{ox1} \frac{W_1}{L_1}(V_{gs} - V_{th1})^2 \quad (1)$$

[Math. 2]
$$I_{out} = \frac{1}{2}\mu_2 C_{ox2} \frac{W_2}{L_2}(V_{gs} - V_{th2})^2 \quad (2)$$

In the current mirror circuit 870 that is the comparative example, the first TFT 871p and the second TFT 872p are the polycrystalline silicon TFTs, and because of this, element characteristics of these vary due to the reason that is already described. More precisely, mobility $\mu_1$ of the first TFT 871p and mobility $\mu_2$ of the second TFT 872p are different from each other, a threshold voltage $V_{th1}$ of the first TFT 871p and a threshold voltage $V_{th2}$ of the second TFT 872p are different from each other. For this reason, the reference electric current $I_{ref}$ and the output electric current $L_{out}$ are different from each other.

In contrast to this, the current mirror circuit 70 according to the embodiment of the present invention, the first TFT 71c and the second TFT 72c are the oxide semiconductor TFTs. Due to the reason that will be described below, the oxide semiconductor TFT has a low variance in element characteristic in comparison with the polycrystalline silicon TFT.

Therefore, mobility $\mu_1$ of the first TFT 71c and mobility $\mu_2$ of the second TFT 72c are easy to set to be almost the same, or a threshold voltage $V_{th1}$ of the first TFT 71c and a threshold voltage $V_{th2}$ of the second TFT 72c are easy to set to be almost the same. For this reason, the reference electric current $I_{ref}$ and the output electric current $I_{out}$ can be set to have substantially the same magnitude. As a result, the precision of the output of the current mirror circuit 70 according to the embodiment of the present invention is easy to improve. Furthermore, because the current mirror circuit 70 is made up of two oxide semiconductor TFTs, TFT 71c and 72c, an increase in the number of circuit elements is suppressed.

The reason that the oxide semiconductor TFT has a low variation in element characteristic in comparison with the polycrystalline silicon TFT is as follows. In a case where a semiconductor material is silicon, four bonds of a Si atom is a path of electric current. Therefore, when the atomic bond is interrupted throughout an amorphous portion or a crystalline interface, there is a need for an electron to jump from one atom to another atom. For this reason, a flow of electric current is non-uniform. In contrast to this, in the case of the oxide semiconductor, a circle-shaped electron orbit (for example, a circle-shaped electron orbit of which the center is an In atom in indium oxide) is a path of an electron. Therefore, the ease with which electric current flows does not greatly change even in an amorphous portion or a crystalline interface. For this reason, when the oxide semiconductor is used, a variation in TFT characteristic can be decreased in comparison with a case where polycrystalline silicon is used.

As described above, according to the embodiment of the present invention, the precision of output of a current mirror circuit that a drive circuit (a gate driver or a source driver) in the active matrix substrate has can be improved while suppressing an increase in the number of circuit elements. The active matrix substrate according to the embodiment of the present invention will be described in more below.

First Embodiment

[Schematic Configuration of the Active Matrix Substrate]

Figure 3:
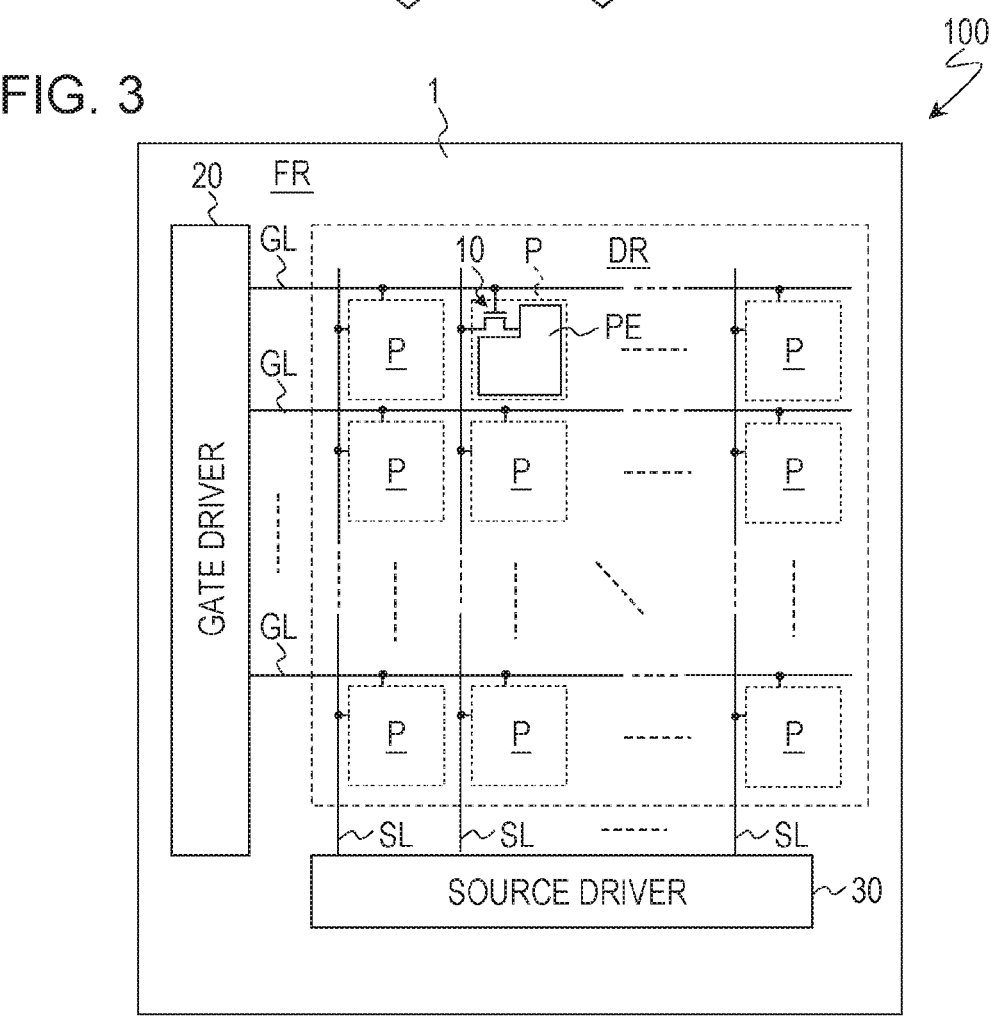
FIG. 3 is a diagram that schematically illustrates an active matrix substrate 100 according to the embodiment of the present invention.

A schematic configuration of an active matrix substrate 100 according to the present embodiment is described with reference to FIG. 3. FIG. 3 is a diagram that schematically illustrates the active matrix substrate 100.

The active matrix substrate 100, as illustrated in FIG. 3, has a display area DR and a non-display area FR. The display area DR includes multiple pixel areas P. The pixel area P is an area that corresponds to a pixel in a display device, and, in the specification in the present patent application, is also referred to simply as a "pixel". The non-display area FR is positioned in the vicinity of the display area DR (more precisely, the non-display area FR is an area other than the display area DR).

Multiple TFTs 10 are arranged within the display area DR. The TFT 10 is provided on every pixel. The TFT 10 is referred to as "pixel TFT". The pixel TFT 10 is supported on the substrate 1. Furthermore, multiple gate wiring lines GL and multiple source wiring lines SL are arranged within the display area DR. The multiple gate wiring lines GL extend in the row direction. In contrast to this, the multiple source wiring lines SL extend in the column direction. In each pixel TFT 10, a scanning signal (a gate signal) is supplied from a corresponding gate wiring line GL, and a display signal (a source signal) is supplied from a corresponding source wiring line SL. Furthermore, in each pixel P, a pixel electrode PE that is electrically connected to the pixel TFT 10 is provided.

A gate driver 20 and a source driver 30 are arranged in the non-display area FR. The gate driver 20 is a drive circuit (a scan line drive circuit) that drives multiple gate wiring lines GL. The source driver 30 is a drive circuit (a signal line drive circuit) that drives multiple source wiring line SL. In the present embodiment, the gate driver 20 is formed monolithically (integrally) formed in the active matrix substrate 100 (more precisely, on the substrate 1).

[Configuration of Each Pixel Area]

Figure 4:
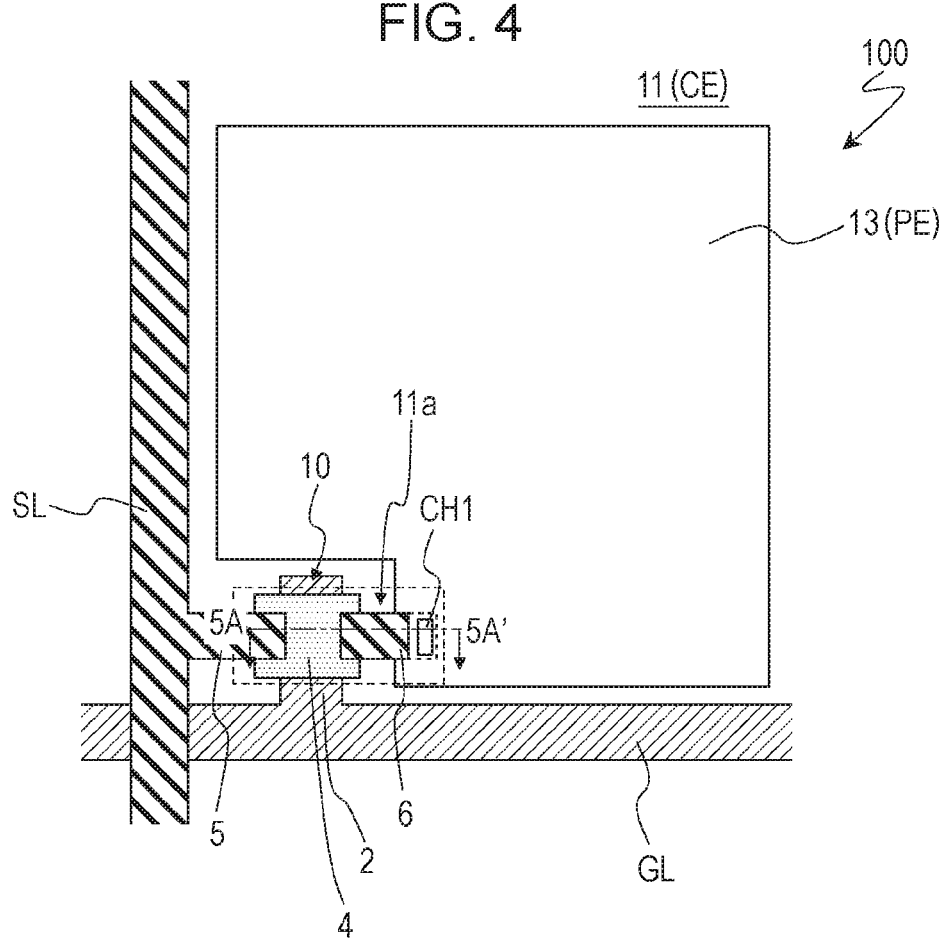
FIG. 4 is a plan-view diagram that schematically illustrates one pixel area P in an active matrix substrate 100.
Figure 5:
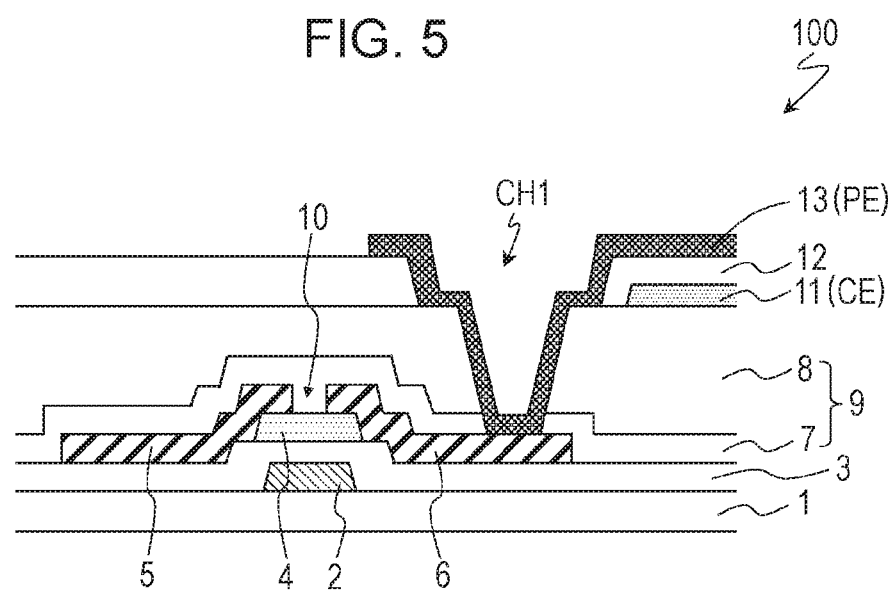
FIG. 5 is a cross-sectional diagram that schematically illustrates the active matrix substrate 100, and illustrates a cross-section taken along line 5A-5A' in FIG. 4.

An example of a configuration of each pixel area P is described with reference to FIGS. 4 and 5. FIG. 4 is a plan-view diagram that schematically illustrates one pixel area P in the active matrix substrate 100. FIG. 5 is a cross-sectional diagram cut along line 5A-5A' in FIG. 4. In FIGS. 4 and 5, the active matrix substrate 100 is illustrated that is used in a display device in a Fringe Field Switching (FFS) mode. The FFS mode is a display mode in compliance with a transverse electric field method in which a pair of electrodes are provided on one substrate and in which an electric field is applied, in a direction (in the horizontal direction) in parallel to a substrate surface, to liquid crystal molecules.

Each of the pixel areas P, as illustrated in FIGS. 4 and 5, has the pixel TFT 10. The pixel TFT 10 is supported on the substrate 1. The substrate 1, for example, is a glass substrate. In an example that is illustrated in each of FIGS. 4 and 5, the pixel TFT 10 has a bottom gate structure.

The pixel TFT 10 has a gate electrode 2 that is provided on the substrate 1, a gate insulating layer 3 that covers the gate electrode 2, an oxide semiconductor layer 4 that is positioned on the gate insulating layer 3, and a source electrode 5 and a drain electrode 6. More precisely, the pixel TFT 10 is the oxide semiconductor TFT that includes the oxide semiconductor layer 4 as the activation layer.

The oxide semiconductor layer 4 is positioned in such a manner as to overlap, at least in part, the gate electrode 2 when viewed from a direction normal to the substrate 1. The source electrode 5 and the drain electrode 6 are electrically connected to the oxide semiconductor layer 4. An area of the oxide semiconductor layer 4, which is brought into contact with the source electrode 5, is referred to as a source contact area, and an area thereof, which is brought into contact with the drain electrode 6, is referred to as a drain contact area. A channel is formed within an area that is positioned between the source contact area and the drain contact area of the oxide semiconductor layer 4 and that overlaps the gate electrode 2 with the gate insulating layer 3 in between. In the present specification, for convenience, an area that includes a portion that is a channel is referred to as "channel region". A length in a channel length direction, of the channel region, is referred to as "channel length", and a length in a direction that orthogonally intersects the channel length direction, of the channel region, is referred to as "channel width". It is noted that in an actual TFT, in some cases, with diffusion or the like of impurity atoms into the channel region, an entire channel region does not function as a channel.

The gate electrode 2 and the source electrode 5 of the pixel TFT 10 are electrically connected to the gate wiring line GL and the source wiring line SL, respectively. In the example that is illustrated in each of FIGS. 4 and 5, the gate electrode 2 is a portion that branches from the gate wiring line GL, and the source electrode 5 is a portion that branches from the source wiring line SL.

In order to cover the pixel TFT 10, an inorganic insulating layer (a protection film) 7 is provided, and an organic insulating layer (a flattening film) 8 is provided on the inorganic insulating layer 7. In the following, the inorganic insulating layer 7 and the organic insulating layer 8 are also collectively referred to as an inter-layer insulating layer 9. The inorganic insulating layer 7, for example, is a SiNx layer or a SiOx layer. Furthermore, the inorganic insulating layer 7 may be configured to result from stacking the SiNx layer and the SiOx layer. The thickness of the inorganic insulating layer 7, for example, is equal to or greater than 100 nm and is equal to or smaller than 500 nm. The organic insulating layer 8, for example, is a resin layer that is formed from a photosensitive resin material. The organic insulating layer 8 is thicker than the inorganic insulating layer 7, and the thickness thereof, for example, is equal to or greater 1 μm and is equal to or smaller than 3 μm. The organic insulating layer 8 is provided in order to level a surface of an upper layer of the pixel TFT 10 or reduce an electrostatic capacity that is formed between the pixel electrode PE and the source wiring line SL or the like.

A lower transparent electrode 11 is provided on the inter-layer insulating layer 9 and a dielectric layer 12 is provided in such a manner as to cover the lower transparent electrode 11. An upper transparent electrode 13 is provided on the dielectric layer 12. Although not illustrated, the upper transparent electrode 13 has a slit or a notched portion. In this example, the lower transparent electrode 11 is a common electrode CE, and the upper transparent electrode 13 is the pixel electrode PE. This electrode structure is disclosed, for example, in International Publication No. 2012/086513. It is noted that the lower transparent electrode 11 may be the pixel electrode PE and the upper transparent electrode 13 may be the common electrode CE. This electrode structure is disclosed, for example, in Japanese Unexamined Patent Application Publication Nos. 2008-032899 and 2010-008758. For reference, the entire contents of International Publication No. 2012/086513 and Japanese Unexamined Patent Application Publication Nos. 2008-032899 and 2010-008758 are incorporated in the present specification by reference.

The pixel electrode PE (the upper transparent electrode 13 here) is separated from every pixel. The drain electrode 6 of the pixel TFT 10 is electrically connected to the pixel electrode PE. In this example, a contact hole (a pixel contact hole) CH1 that extends to the drain electrode 6 is formed on the inter-layer insulating layer 9 and the dielectric layer 12, and the upper transparent electrode 13 is provided on the inter-layer insulating layer 9 and within the pixel contact hole CH1, in such a manner as to be brought into direct contact with the drain electrode 6 within the pixel contact hole CH1.

The common electrode CE (the lower transparent electrode 11 here) may be separated from every pixel. The common electrode CE may be formed over almost all portions of the display area DR, except for an area that is positioned on the pixel TFT 10. In this example, the common electrode CE has an opening portion 11a that overlaps the pixel TFT 10 and the contact hole CH1 for making a connection to the pixel TFT 10 and the pixel electrode PE, when viewed from the direction normal to the substrate 1.

In the active matrix substrate 100, the gate driver 20 includes the current mirror circuit 70. A specific configuration of the gate driver 20 will be described below.

[Configuration of the Gate Driver]

Figure 6:
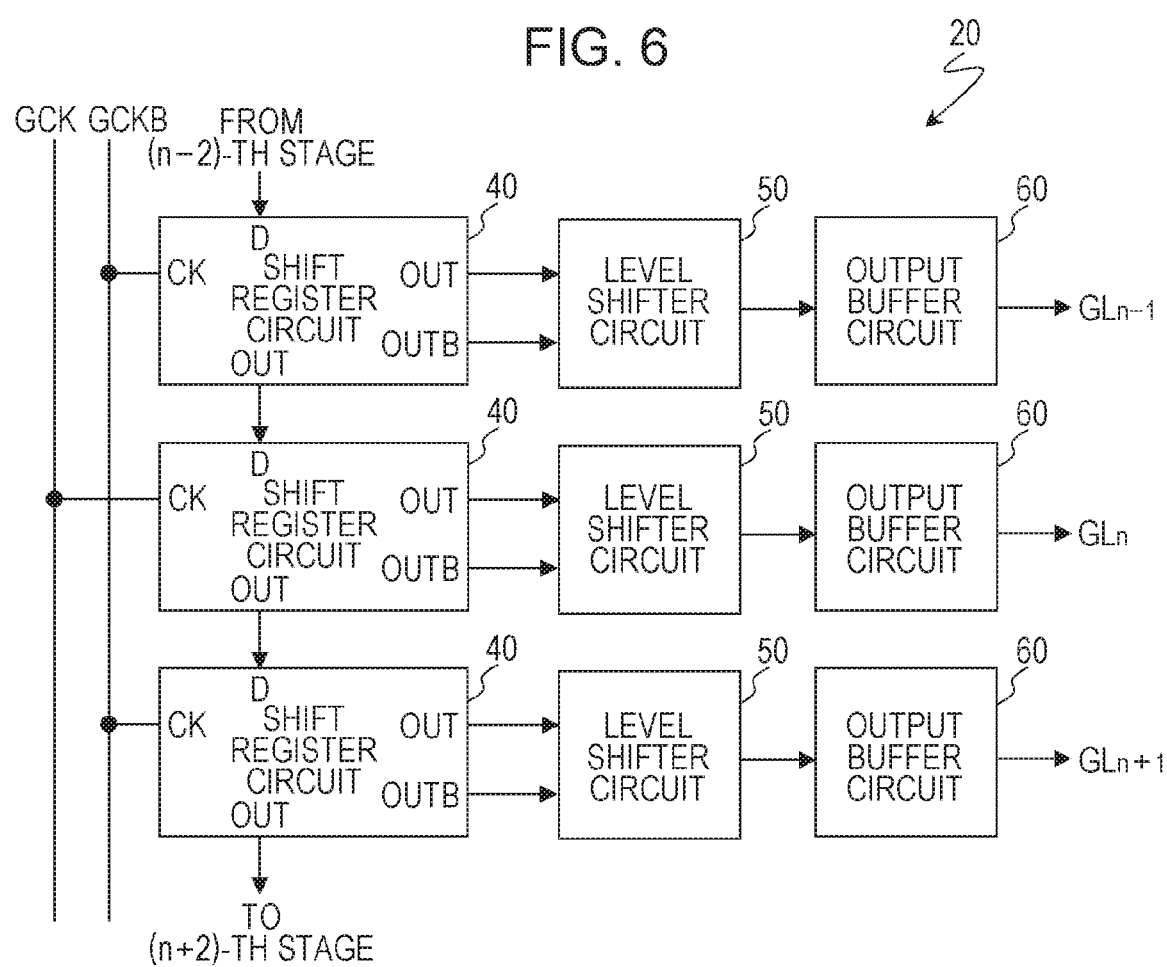
FIG. 6 is a block diagram that schematically illustrates a gate driver 20 which is included in the active matrix substrate 100.

FIG. 6 illustrates an example of a specific configuration of the gate driver 20. As illustrated in FIG. 6, the gate driver 20 is configured to have multiple stages that are connected in a cascade form. An (n−1)-th stage, an n-th stage, and an (n+1)-th are illustrated in FIG. 6. Each stage includes a shift register circuit 40, a level shifter circuit 50, and an output buffer circuit 60. Each of the shift register circuit 40, the level shifter circuit 50, and the output buffer circuit 60 is configured to include multiple TFTs.

The shift register circuit 40 has an input terminal through which a clock CK and data D each are input, and an output terminal through which output signals OUT and OUTB each are output. A gate clock signal GCK or GCKB is input as the clock CK. One of the gate clock signals GCK and GCKB is input into the shift register circuit 40 in an odd-numbered stage and the other is input into the shift register circuit 40 in an even-numbered stage. The output signal OUT of the shift register circuit 40 in a previous stage is input as the data D. The output signals OUT and OUTB that are output from the shift register circuit 40 is input into the level shifter circuit 50.

The level shifter circuit 50 is a circuit that increases (more precisely, performs level conversion of) amplitude of an input signal. A signal that is output from the level shifter circuit 50 is input into the output buffer circuit 60.

The gate signal is output from the output buffer circuit 60. The gate signal that is output is supplied to the corresponding gate wiring line GL. In FIG. 6, gate signals that are supplied gate wiring lines GL in an (n−1)-th row, an n-th row, and an (n+1)-th row are expressed as $GL_{n-1}$, $GL_n$, and $GL_{n+1}$, respectively.

The shift register circuit 40 can be configured with multiple MOS transistors. The shift register circuit 40, for example, may be a CMOS circuit. Alternatively, the shift register circuit 40 may be configured with only a PMOS transistor and may be configured with only an NMOS transistor.

Figure 7:
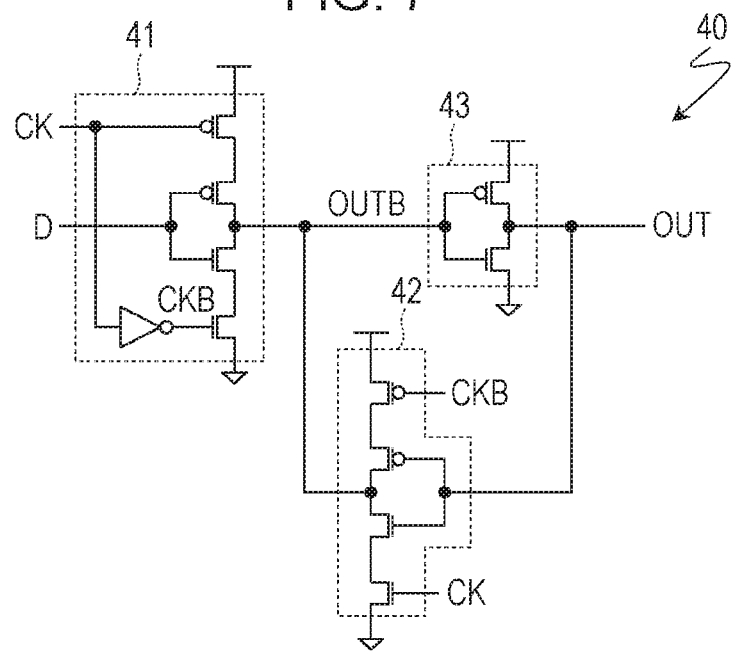
FIG. 7 is a circuit diagram illustrating an example of a shift register circuit 40 that the gate driver 20 has.

FIG. 7 illustrates an example of the shift register circuit 40 that is configured with a CMOS circuit. The shift register circuit 40 that is illustrated in FIG. 7 is a so-called delay flip-flop. In an example that is illustrated in FIG. 7, the shift register circuit 40 is configured with first and second clock inverters 41 and 42, and an inverter 43. Each of the first clock inverter 41, the second clock inverter 42, and the inverter 43 is a CMOS circuit.

The first clock inverter 41 and the inverter 43 are in series connected to each other. An input terminal of the second clock inverter 42 is connected to an output terminal of the inverter 43, and an output terminal of the second clock inverter 42 is connected to an input terminal of the inverter 43. The clock CK is input into each of the PMOS side input terminal of the first clock inverter 41 and the NMOS side input terminal of the second clock inverter 42. An inversion clock CKB is input into each of the NMOS side input terminal of the first clock inverter 41 and the PMOS side input terminal of the second clock inverter 42.

Figure 8:
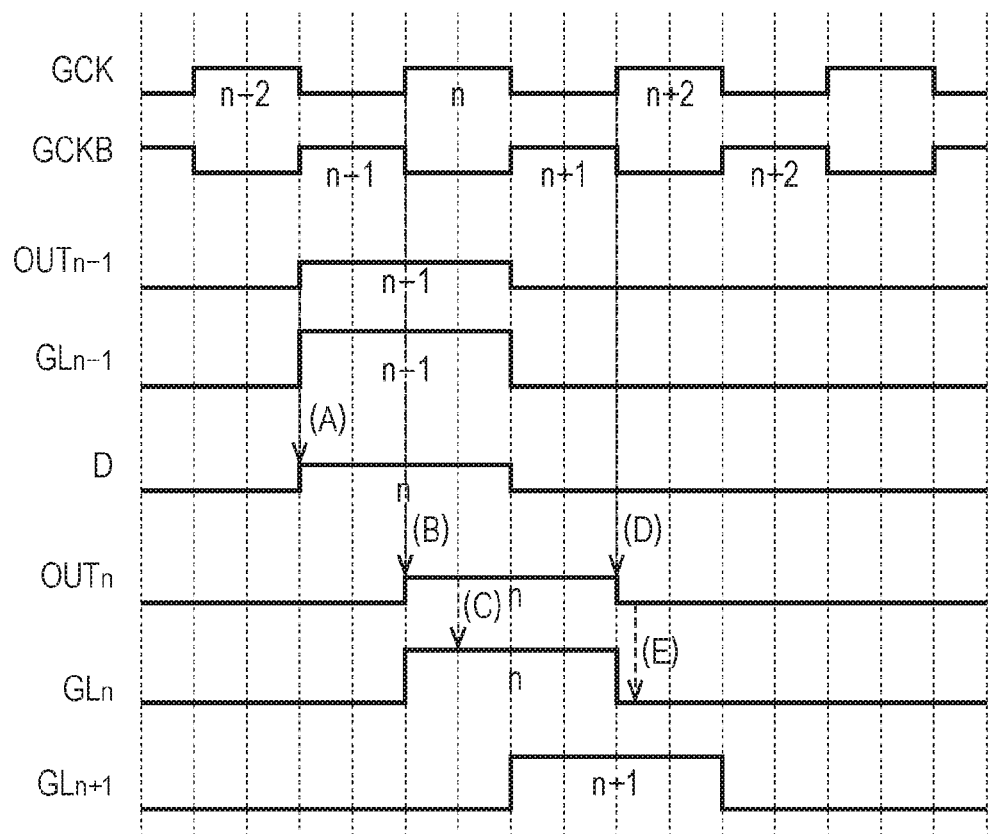
FIG. 8 is timing charts for gate clock signals GCK and GCKB, data D, output signals $OUT_{n-1}$ and $OUT_n$ in an (n−1)-th stage and an n-th stage, and gate signals $GL_{n-1}$, $GL_n$, and $GL_{n+1}$ in the (n−1)-th stage, the n-th stage, and an (n+1)-th stage.

Operation of the shift register circuit 40 in an n-th state is described with reference to FIG. 8. FIG. 8 is timing charts for the gate clock signals GCK and GCKB, the data D, the output signals $OUT_{n-1}$ and $OUT_n$ in the (n−1)-th stage and the n-th stage, and the gate signals $GL_{n-1}$, $GL_n$, and $GL_{n+1}$ in the (n−1)-th stage, the n-th stage, and the (n+1)-th stage.

First, when the output signal $OUT_{n-1}$ in the (n−1)-th stage is at High electric potential, a signal at High electric potential is input, as the data D, into the shift register circuit 40 in the n-th stage (a point in time (A) in FIG. 8).

Next, in a state where the data D is at High electric potential, at a timing at which the gate clock signal GCK is at High electric potential, the output signal $OUT_n$ in the n-th stage is at High electric potential (a point in time (B)).

When the output signal $OUT_n$ in the n-th stage is at High electric potential, a voltage level thereof is converted in the level shifter circuit 50 into which the output signal $OUT_n$ in the n-th stage is input, and the gate signal GL, at High electric potential is output from the output buffer circuit 60 that receives a post-conversion signal (a point in time (C)).

Subsequently, at a timing at which the gate clock signal GCK is again at High electric potential, the output signal $OUT_{n-1}$ in the (n−1)-th stage is at Low electric potential, and because of this, the output signal $OUT_n$ in the n-th stage is at Low electric potential (an output reset: a point in time (D)).

When the output signal $OUT_n$ in the n-th stage is at Low electric potential, the voltage level thereof is converted in the level shifter circuit 50 into which the output signal $OUT_n$ in the n-th stage is input, and the gate signal GL, at Low electric potential is output from the output buffer circuit 60 that receives the post-conversion signal (a point in time (E)). In this manner, the shift register circuit 40 operates.

Figure 9:
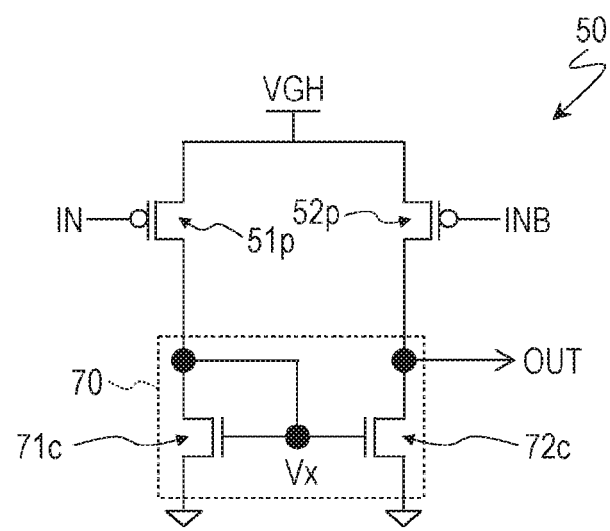
FIG. 9 is a circuit diagram illustrating an example of a level shifter circuit 50 that the gate driver 20 has.

An example of a specific configuration of the level shifter circuit 50 is described with reference to FIG. 9. FIG. 9 is a circuit diagram illustrating the level shifter circuit 50.

The level shifter circuit 50, as illustrated in FIG. 9, is configured with first and second PMOS transistors 51p and 52p, and first and second NMOS transistors 71c and 72c. Each of the first and second PMOS transistors 51p and 52p is a polycrystalline silicon TFT. Each of the first and second NMOS transistors 71c and 72c is an oxide semiconductor TFT.

A source electrode of each of the first and second PMOS transistors 51p and 52p is electrically connected to a high electric potential side power source that supplies gate-ON electric potential VGH. The output signal OUT from the shift register circuit 40 is input, as an input signal IN, to a gate electrode of the first PMOS transistor 51p. The output signal OUTB from the shift register circuit 40 is input, as an input signal INB, to a gate electrode of the second PMOS transistor 52p.

A drain electrode of the first PMOS transistor 51p, a drain electrode and a gate electrode of the first NMOS transistor 71c, and a gate electrode of the second NMOS transistor 72c are connected to each other. A drain electrode of the second PMOS transistor 52p and a drain electrode of the second NMOS transistor 72c are connected to an output terminal of the level shifter circuit 50 (through which the output signal OUT is output). Source electrodes of the first and second NMOS transistors 71c and 72c are connected to each other.

Figure 10:
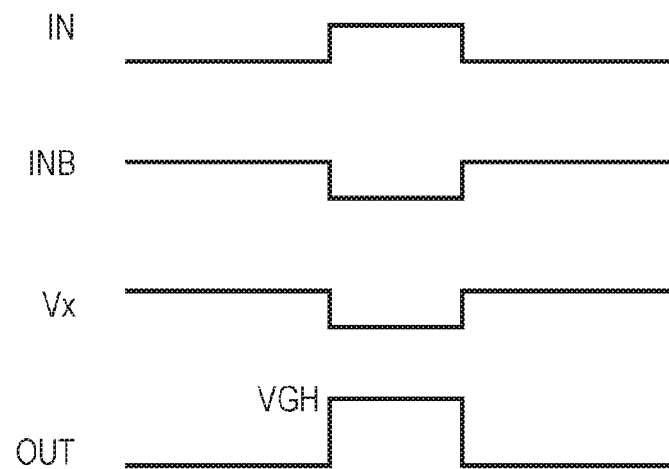
FIG. 10 is timing charts for input signals IN and INB to a level shifter circuit 50, gate electric potential Vx of each of the first and second NMOS transistors 71c and 72c, and an output signal OUT from the level shifter circuit 50.

In the level shifter circuit 50 that is illustrated in FIG. 9, the current mirror circuit 70 is configured with the first and second NMOS transistors 71c and 72c. Operation the level shifter circuit 50 will be described below with reference to FIG. 10. FIG. 10 is timing charts for the input signals IN and INB to the level shifter circuit 50, gate electric potential Vx of each of the first and second NMOS transistors 71c and 72c, and the output signal OUT from the level shifter circuit 50.

At the time of non-selection, more precisely, when the input signal IN is at Low electric potential and the input signal INB is at High electric potential, the first PMOS transistor 51*p* is in an ON state, and because of this, given electric current $I_{ref}$ flows through the first NMOS transistor 71*c*. At this time, electric current having that has almost the same magnitude as the electric current $I_{ref}$ which flows through the first NMOS transistor 71*c* also flows through the second NMOS transistor 72*c*. Because the second PMOS transistor 52*p* is in an OFF state, the output signal OUT (gate-OFF electric potential) (which is 0 V here) at Low electric potential is output from the level shifter circuit 50.

On the other hand, at the time of selection, more precisely, when the input signal IN is at High electric potential and the input signal INB is at Low electric potential, the first PMOS transistor 51*p* is in an OFF state, and because of this, electric current that flows through the first NMOS transistor 71*c* is almost zero. At this time, the second NMOS transistor 72*c* is in an OFF state and the second PMOS transistor 52*p* is in an ON state, and because of this, the output signal OUT (the gate-On electric potential VGH) at High electric potential is output from the level shifter circuit 50.

In this manner, the level shifter circuit 50 can convert (level-shifts) amplitude (for example, 0 V/3 V) of each of the input signals IN and INB into desired amplitude (VGH/0 V here).

As already described with reference to FIG. 2, when the current mirror circuit is configured with only two polycrystalline silicon TFTs, the element characteristic of the polycrystalline silicon TFT varies widely, and because of this, the precision of the output of the current mirror circuit decreases. For this reason, when that type of current mirror circuit is used, a characteristic of the level shifter circuit in each stage of the gate driver varies and it is easy for a failure to occur in operation of the gate driver.

For example, in a case where a threshold voltage of the polycrystalline silicon TFT is high, drive electric current decreases. Because of this, an inversion speed of the level shifter circuit decreases and thus an output timing is delayed. For this reason, driving in a next stage is delayed, and when there is a discrepancy between the clock and the timing, the likelihood that a failure will occur increases. Furthermore, in a case where the threshold voltage decreases, through-electric current increases, and because of this, consumption electric current increases.

Figure 11:
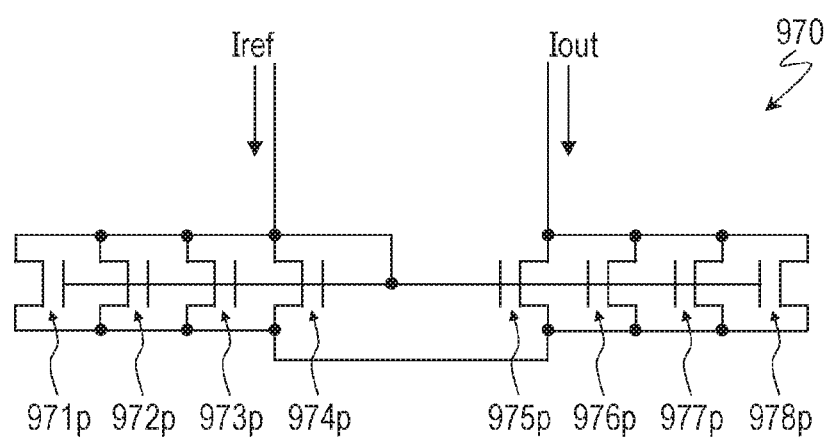
FIG. 11 is a circuit diagram illustrating a current mirror circuit 970 that is disclosed in PTL 1.

Furthermore, as already described, in FIG. 9 in PTL 1, a current mirror circuit that is configured with 8 NMOS transistors (polycrystalline silicon TFTs) is illustrated. FIG. 11, a current mirror circuit 970 that is disclosed in PTL 1 is illustrated. The current mirror circuit 970 that is illustrated in FIG. 11 has first to eighth NMOS transistors 971*p* to 978*p* that are in parallel connected to each other. Each of the first to eighth NMOS transistors 971*p* to 978*p* is a polycrystalline silicon TFT. A gate electrode of each of the first to eighth NMOS transistor 971*p* to 978*p* is connected to the constant electric current source that supplies the reference electric current $I_{ref}$. Furthermore, source electrodes of the first to eighth NMOS transistors 971*p* to 978*p* are connected to each other.

Drain electrodes of the first, second, third, and fourth NMOS transistors 971*p*, 972*p*, 973*p*, and 974*p* are connected to the constant electric current source. Drain electrodes of the fifth, sixth, seventh, and eighth NMOS transistors 975*p*, 976*p*, 977*p*, and 978*p* are connected to an output terminal of the current mirror circuit 970.

The reference electric current $I_{ref}$ and the output electric current $I_{out}$ in the current mirror circuit 970 are expressed in the following Equations (3) and (4), respectively. $V_{average\ 1}$ in Equation (3) is an average value of threshold voltages of the first to fourth NMOS transistors 971*p* to 974*p*, and $V_{average\ 2}$ in Equation (4) is an average value of threshold voltages of the fifth to eighth transistors 975*p* to 978*p*.

[Math. 3]

$$I_{ref} = \frac{1}{2}\mu_1 C_{ox1} \frac{W_1}{L_1}(V_{gs} - V_{average1})^2 \quad (3)$$

[Math. 4]

$$I_{out} = \frac{1}{2}\mu_2 C_{ox2} \frac{W_2}{L_2}(V_{gs} - V_{average2})^2 \quad (4)$$

As understood from Equations (3) and (4), in the current mirror circuit 970 that is illustrated in FIG. 11, influences that a variation in the threshold voltage exerts on the reference electric current $I_{ref}$ and the output electric current $I_{out}$ are averaged, and because of this, the precision of output increases. However, because the number of elements that constitute the current mirror circuit 970 increases, there is a concern that consumption electric current will increase and that a yield will decrease.

In contrast to this, in the current mirror circuit 70 according to the present embodiment, the oxide semiconductor TFTs 71*c* and 72*c* are used, and because of this, a variation in element characteristic between the TFTs 71*c* and 72*c* that constitute the current mirror circuit 70 is suppressed. For this reason, the precision of output is improved.

Furthermore, because the current mirror circuit 70 is made up of two oxide semiconductor TFTs, the TFTs 71*c* and 72*c* (more precisely, the number of elements is 2), a circuit scale can be decreased. For this reason, low power consumption and frame narrowing of the active matrix substrate 100 (consequently, of a display device that includes the active matrix substrate 100) can be realized. Furthermore, the yield is also improved.

Second Embodiment

Figure 12:
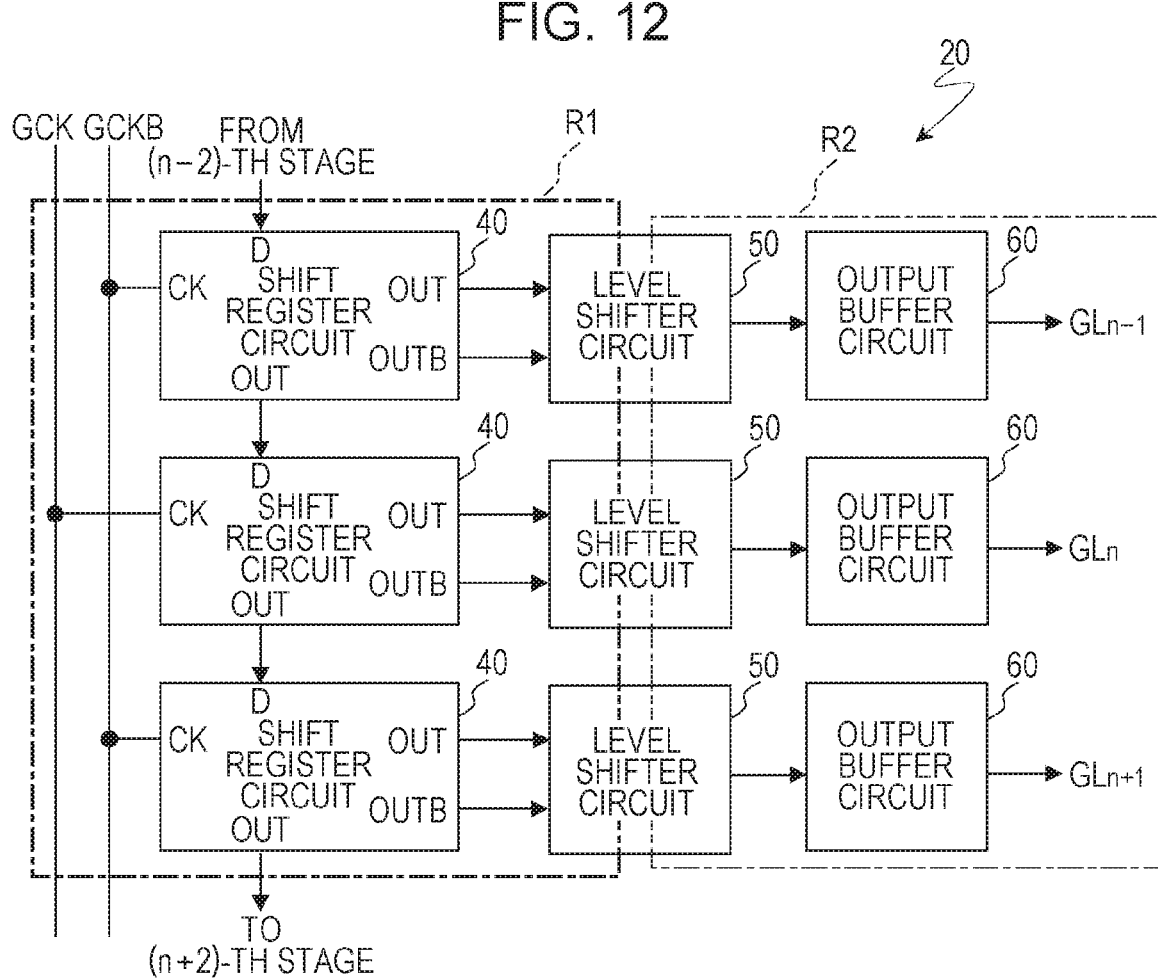
FIG. 12 is a block diagram illustrating the gate driver 20 that is included in the active matrix substrate according to the embodiment of the present invention.
Figure 13:
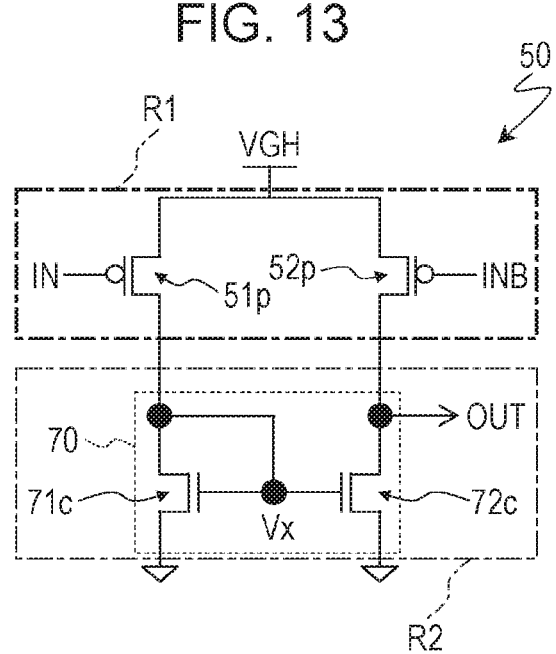
FIG. 13 is a circuit diagram illustrating the level shifter circuit 50 that the gate driver 20 has.

An active matrix substrate according to the present embodiment is described with reference to FIGS. 12 and 13. FIG. 12 is a block diagram illustrating the gate driver 20 that is included in the active matrix substrate according to the present embodiment. FIG. 13 is a circuit diagram illustrating the level shifter circuit 50 that the gate driver 20 has.

The gate driver 20, as illustrated in FIG. 12, is configured to have multiple stages that are connected in a cascade form. Each stage includes the shift register circuit 40, the level shifter circuit 50, and the output buffer circuit 60.

The level shifter circuit 50 of the gate driver 20, as illustrated in FIG. 13, is configured with the first and second PMOS transistors 51*p* and 52*p*, and the first and second NMOS transistors 71*c* and 72*c*. The level shifter circuit 50 that is illustrated in FIG. 13 is substantially the same as the level shifter circuit 50 that is illustrated in FIG. 9, and the current mirror circuit 70 is configured with the first and second NMOS transistors 71*c* and 72*c*.

In the present embodiment, each of the multiple TFTs that constitute the shift register circuit 40 is a polycrystalline silicon TFT. Furthermore, each of the PMOS transistors 51*p* and 52*p*, among the multiple TFTs that constitute the level shifter circuit 50 is a polycrystalline silicon TFT. In FIGS.

12 and 13, an area in which the polycrystalline silicon TFT is formed as a TFT is depicted as an area R1 that is surrounded by a chain line.

Furthermore, in the present embodiment, each of the NMOS transistors 71c and 72c, among the multiple TFTs that constitute the level shifter circuit 50, is an oxide semiconductor TFT, and each of the multiple TFTs that constitute the output buffer circuit 60 is also an oxide semiconductor TFT. In FIGS. 12 and 13, an area in which the oxide semiconductor TFT is formed as a TFT is depicted as an area R2 that is surrounded by a chain line.

In the present embodiment, the current mirror circuit 70 that is included in the level shifter circuit 50 is configured with two oxide semiconductor TFTs, the TFTs 71c and the TFT 72c, and because of this, the same effect as in the active matrix substrate 100 according to the first embodiment can be obtained.

Furthermore, in the present embodiment, as understood from FIG. 12, the polycrystalline silicon TFT is formed only in a circuit portion at a low voltage, and because of this, there is no need for a process of increasing a breakdown voltage of the polycrystalline silicon TFT. For this reason, the number of processes in a manufacturing process can be reduced.

Third Embodiment

Figure 14:
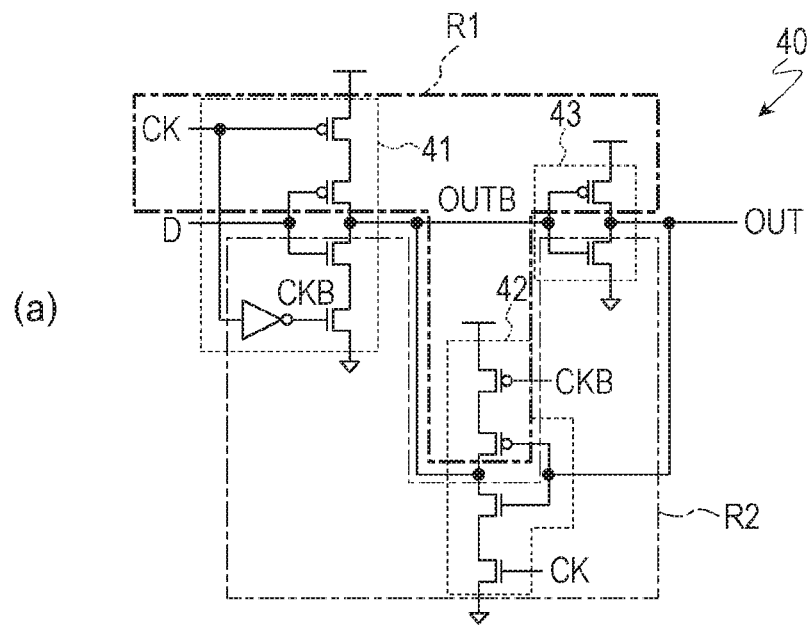
FIGS. 14(a), 14(b), and 14(c) are circuit diagrams that illustrate a shift register circuit 40, a level shifter circuit 50, and an output buffer circuit 60, respectively, which are included in the gate driver in the active matrix substrate according to the embodiment of the present invention.
FIG. 14(d) is a circuit diagram illustrating another example of the output buffer circuit 60.
Figure 14:
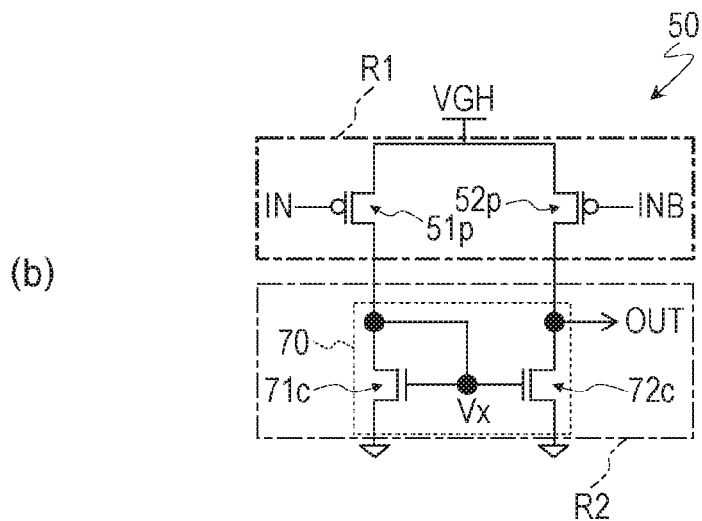
Figure 14:
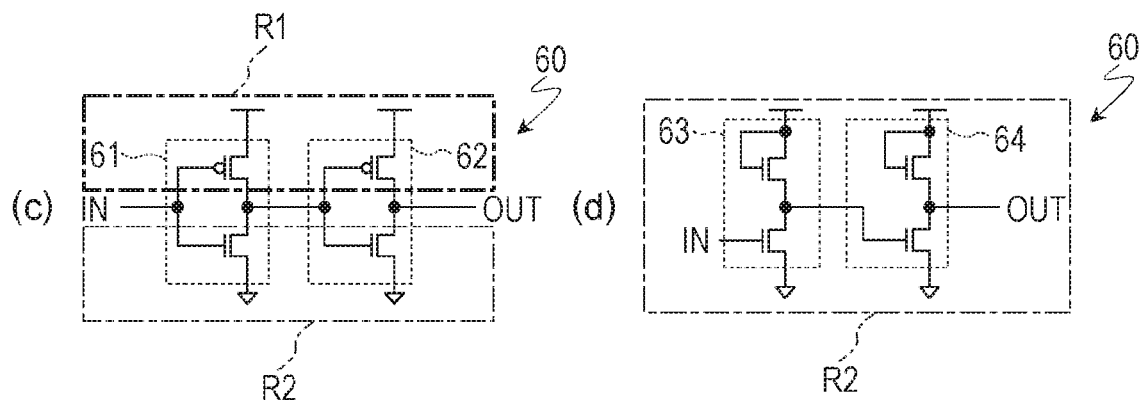

An active matrix substrate according to the present embodiment is described with reference to FIG. 14. FIGS. 14(a), 14(b), and 14 (c) are circuit diagrams each illustrating the shift register circuit 40, the level shifter circuit 50, and the output buffer circuit 60 that are included in a gate driver that is included in the active matrix substrate according to the present embodiment. FIG. 14(d) is a circuit diagram illustrating another example of the output buffer circuit 60.

In the same manner as the shift register circuit 40 that is illustrated in FIG. 7, the shift register circuit 40 that is illustrated in FIG. 14(a) is configured with the first and second clock inverters 41 and 42 and the inverter 43. In FIG. 14(a), the area R1 in which the polycrystalline silicon TFT is formed as a TFT and the area R2 where the oxide semiconductor TFT is formed as a TFT are illustrated.

As illustrated in FIG. 14(a), two PMOS transistors among four TFTs that constitute the first clock inverter 41 are polycrystalline silicon TFTs, and the remaining two NMOS transistors are oxide semiconductor TFTs. Furthermore, two PMOS transistors among four TFTs that constitute the second clock inverter 42 are polycrystalline silicon TFTs, and the remaining two NMOS transistors are oxide semiconductor TFTs. Moreover, one PMOS transistor of two TFTs that constitute the inverter 43 is a polycrystalline silicon TFT, and the remaining one NMOS transistor is an oxide semiconductor TFT.

In this manner, among the multiple TFTs that are included in the shift register circuit 40, the polycrystalline silicon TFT is formed as the PMOS transistor, and the oxide semiconductor TFT is formed as the NMOS transistor.

In the same manner as the level shifter circuit 50 that is illustrated in FIG. 9, the level shifter circuit 50 that is illustrated in FIG. 14(b) is configured with the first and second PMOS transistors 51p and 52p and the first and second NMOS transistors 71c and 72c. The current mirror circuit 70 is configured with the first and second NMOS transistors 71c and 72c. In FIG. 14(b), the area R1 in which the polycrystalline silicon TFT is formed as a TFT and the area R2 where the oxide semiconductor TFT is formed as a TFT are also illustrated.

As illustrated in FIG. 14(b), the first and second PMOS transistors 51p and 52p are polycrystalline silicon TFTs, and the first and second NMOS transistors 71c and 72c are oxide semiconductor TFTs.

In this manner, among the multiple TFTs that are included in the level shifter circuit 50, the polycrystalline silicon TFT is formed as the PMOS transistor, and the oxide semiconductor TFT is formed as the NMOS transistor.

The output buffer circuit 60 that is illustrated in FIG. 14(c) is configured with first and second inverters 61 and 62. Each of the first and second inverters 61 and 62 is a CMOS circuit that includes a PMOS transistor and a NMOS transistor. In FIG. 14(c), the area R1 in which the polycrystalline silicon TFT is formed as a TFT and the area R2 where the oxide semiconductor TFT is formed as a TFT are illustrated.

As illustrated in FIG. 14(c), a PMOS transistor of the first inverter 61 and a PMOS transistor of the second inverter 62 are polycrystalline silicon TFTs, and an NMOS transistor of the first inverter 61 and an NMOS transistor of the second inverter 62 are oxide semiconductor TFTs.

In this manner, among multiple TFTs that are included in the output buffer circuit 60 that is illustrated in FIG. 14(c), a polycrystalline silicon TFT is formed as a PMOS transistor, and an oxide semiconductor TFT is formed as an NMOS transistor.

The output buffer circuit 60 that is illustrated in FIG. 14(d) is configured with first and second inverters 63 and 64. Each of the first and second inverters 63 and 64 includes two NMOS transistors. In FIG. 14(d), the area R2 in which the oxide semiconductor TFT is formed as a TFT is illustrated.

As illustrated in FIG. 14(d), two NMOS transistors of the first inverter 63 and two NMOS transistors of the second inverter 64 are oxide semiconductor TFTs.

In this manner, the multiple TFTs that are included in the output buffer circuit 60 that is illustrated in FIG. 14(d) are all NMOS transistors, and oxide semiconductor TFTs are formed as the NMOS transistors.

As described above, in the present embodiment, among multiple TFTs that are included in the gate driver, a PMOS transistor is a polycrystalline silicon TFT, and a NMOS transistor is an oxide semiconductor TFT. For this reason, when the polycrystalline silicon TFT is formed, only a process of forming the PMOS transistor may be sufficient without the need to form the NMOS transistor. Therefore, the number of processes in the manufacturing process can be reduced.

Fourth Embodiment

Figure 15:
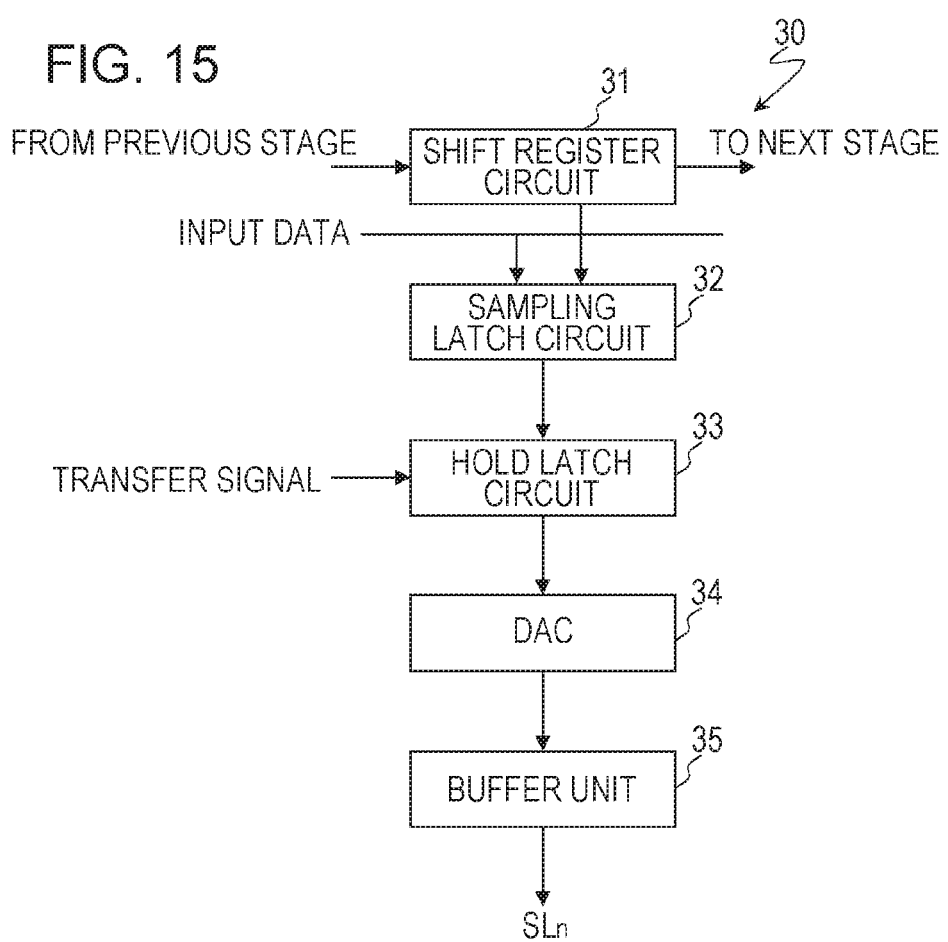
FIG. 15 is a block diagram illustrating a source driver 30 that is included in the active matrix substrate according to the embodiment of the present invention.

An active matrix substrate according to the present embodiment is described with reference to FIG. 15. FIG. 15 is a block diagram illustrating the source driver 30 that is included in an active matrix substrate according to the present embodiment. In the present embodiment, the source driver 30 is monolithically formed on the substrate.

As illustrated in FIG. 15, the source driver 30 is configured to have multiple stages that are connected in a cascade form. In FIG. 15, an n-th stage is illustrated. Each stage includes a shift register circuit 31, a sampling latch circuit 32, a hold latch circuit 33, a digital-to-analog conversion circuit (a digital-to-analog converter (DAC)) 34, and a buffer unit 35.

During a certain one horizontal scan duration, the source driver 30 operates as follows.

The shift register circuit 31 in each stage sets the sampling latch circuit 32 in each stage to be in a sequential fetching-available state, based on a control signal (a source start pulse) from a controller. The sampling latch circuit 32 stores input data that is sent from the controller. As a result, input data for one row (equivalent to one gate wiring line) are sequentially stored in the sampling latch circuit 32.

At this point, when the controller sends the control signal (the gate start pulse) to the gate driver, but also a transfer signal to the hold latch circuit 33, not only is one gate wiring line selected (all TFTs that are connected to one gate wiring line are in an ON state), but all hold latch circuits 33 are also in a fetching-available. Accordingly, pieces of data that are stored in the sampling latch circuits 32 are all transferred to the hold latch circuit 33 and are fetched. The hold latch circuit 33 sends fetched input data to the DAC 34. The input data that is sent to the DAC 34 is converted to an analog signal voltage, and is the analog signal is sent to the buffer unit 35. The buffer unit 35 supplies an analog signal voltage that is input from the DAC 34, as a source signal SLn, to a source wiring line.

This operation is sequentially performed on each gate wiring line, and thus a signal voltage is written to all pixels.

Figure 16:
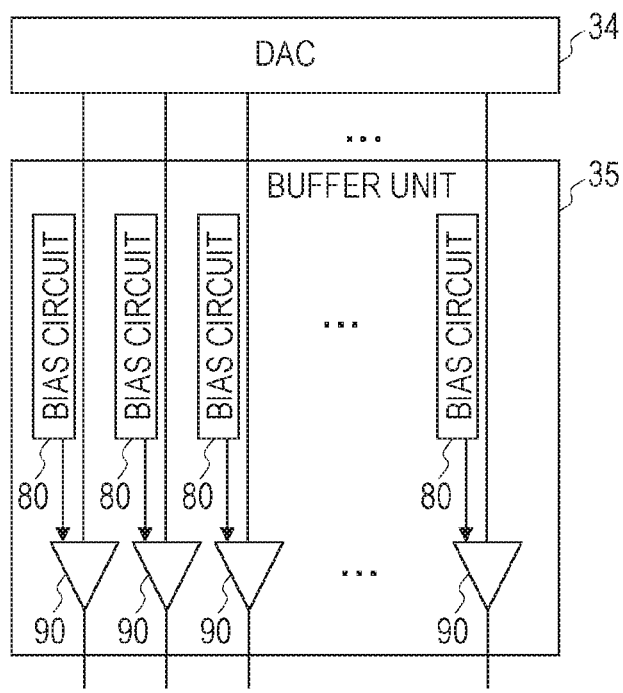
FIG. 16 is a block diagram illustrating a DAC 34 and a buffer unit 35 of the source driver 30.

Subsequently, a configuration of the buffer unit 35 is described in more detail. FIG. 16 is a block diagram illustrating the DAC 34 and the buffer unit 35 of the source driver 30.

The buffer unit 35 is provided in order to drive a source wiring line that is connected to a pixel (a pixel capacity), at a high speed, and has multiple bias circuits 80 and multiple output buffer circuits 90. At this point, an example is described in which each output buffer circuit 90 is connected to one bias circuit 80 to which it corresponds. Each output buffer circuit 90 is configured to include multiple TFTs. A bias voltage is supplied from the bias circuit 80 to each output buffer circuit 90.

Figure 17:
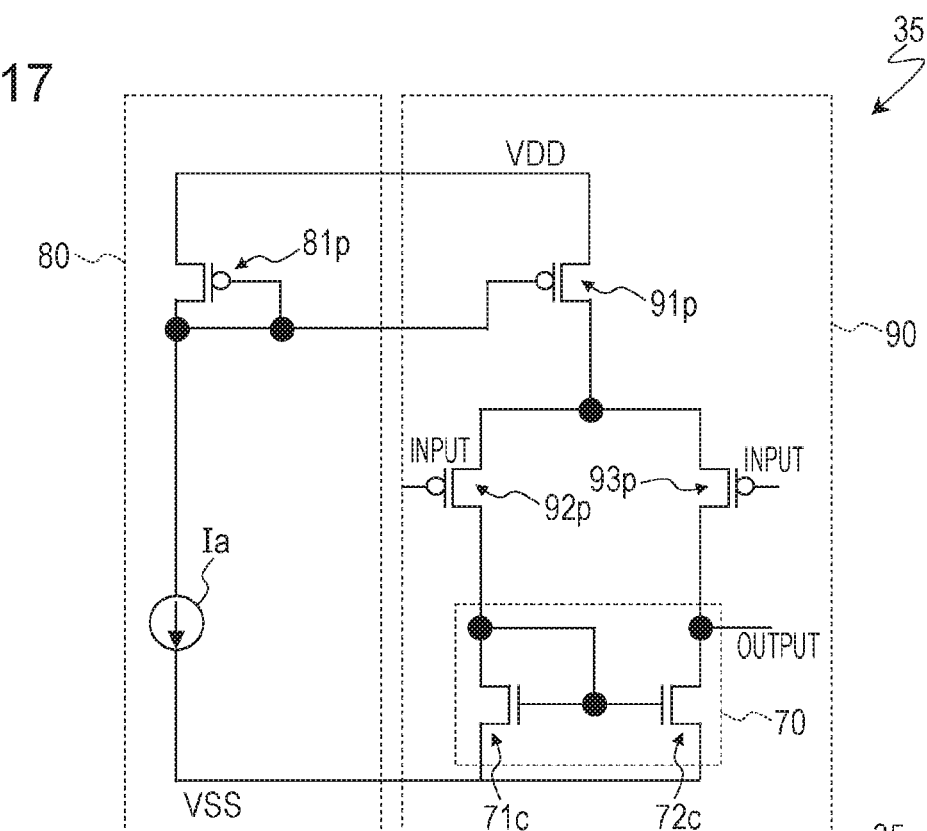
FIG. 17 is a circuit diagram illustrating the buffer unit 35 that includes a bias circuit 80 and an output buffer circuit 90.

In FIG. 17, a more specific configuration of the buffer unit 35 is illustrated. FIG. 17 is a circuit diagram illustrating the buffer unit 35 that includes the bias circuit 80 and the output buffer circuit 90.

As illustrated in FIG. 17, the bias circuit 80 includes a constant electric current source Ia and a PMOS transistor 81p. The PMOS transistor 81p is a polycrystalline silicon TFT.

The output buffer circuit 90 includes first, second, and third PMOS transistors 91p, 92p, and 93p, and the first and second NMOS transistors 71c and 72c. Each of the first, second, and third PMOS transistors 91p, 92p, and 93p is a polycrystalline silicon TFT. Each of the first and second NMOS transistors 71c and 72c is an oxide semiconductor TFT.

A drain electrode and a gate electrode of the PMOS transistor 81p of the bias circuit 80, and a gate electrode of the first PMOS transistor 91p of the output buffer circuit 90 are connected to each other. Furthermore, a source electrode of the PMOS transistor 81p and a source electrode of the first PMOS transistor 91p are connected to a high electric potential side power source VDD. The constant electric current source Ia is provided between the drain electrode of the PMOS transistor 81p and a low electric potential side power source VSS, and constant electric current flows from the drain electrode of the PMOS transistor 81p in a direction toward the low electric potential side power source VSS.

A gate electrode of the second PMOS transistor 92p of the output buffer circuit 90 and a gate electrode of the third PMOS transistor 93p are connected to two input terminals, respectively, of the output buffer circuit 90. One of the two input terminals is connected to the DAC 34, and the other is short-circuited to an output terminal of the output buffer circuit 90.

A drain electrode of the first PMOS transistor 91p, and a source electrode of the second PMOS transistor 92p, and a source electrode of the third PMOS transistor 93p are connected to each other. Furthermore, a drain electrode of the second PMOS transistor 92p, the drain electrode and the gate electrode of the first NMOS transistor 71c, the gate electrode of the second NMOS transistor 72c, are connected to each other. Moreover, a drain electrode of the third PMOS transistor 93p and the drain electrode of the second NMOS transistor 72c are connected to the output terminal of the output buffer circuit 90.

A source wiring line is connected to the output terminal of the output buffer circuit 90. Furthermore, a source electrode of the first NMOS transistor 71c and a source electrode of the second NMOS transistor 72c are connected to the low electric potential side power source VSS.

In the buffer unit 35 that is illustrated in FIG. 17, the first NMOS transistor 71c and the second NMOS transistor 72c of the output buffer circuit 90 function as the current mirror circuit 70. When an analog signal from the DAC 34 is input into one (an input terminal that is not short-circuited to the output terminal) of the two input terminals of the output buffer circuit 90, electric current flows from the output terminal to the source wiring line, or the source wiring line to the output terminal in such a manner that the output terminal of the output buffer circuit 90 is at the same electric potential as the analog signal. For this reason, an analog signal voltage can be written on each pixel through the source wiring line.

As described above, in the buffer unit 35 that is illustrated in FIG. 17, the output buffer circuit 90 includes the current mirror circuit 70. Because the oxide semiconductor TFTs 71c and 72c are used in the current mirror circuit 70, a variation in element characteristic between the TFTs 71c and 72c that constitute the current mirror circuit 70 is suppressed. For this reason, the precision of output is improved. Furthermore, because the current mirror circuit 70 is made up of two oxide semiconductor TFTs, the TFTs 71c and 72c (more precisely, the number of elements is 2), the circuit scale can be decreased. For this reason, the low power consumption and the frame narrowing of the active matrix substrate (consequently, of the display device that includes the active matrix substrate) can be realized. Furthermore, the yield is also improved.

Figure 18:
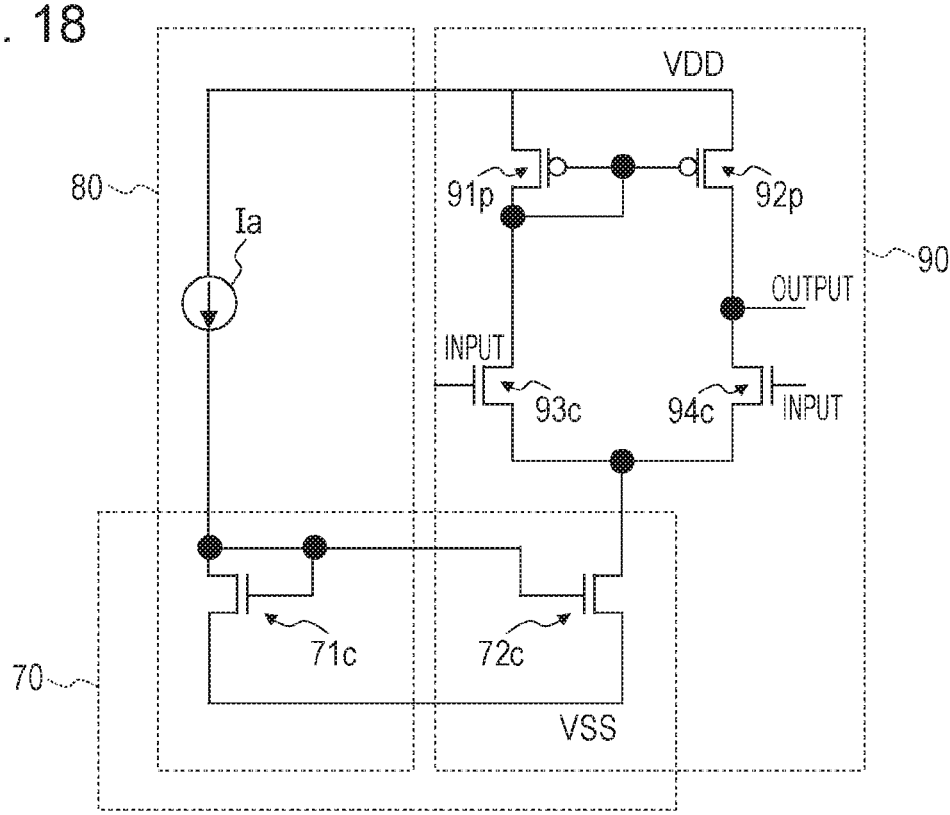
FIG. 18 is a circuit diagram illustrating another example of the buffer unit 35.

It is noted that a specific circuit configuration of the buffer unit 35 is not limited to an example that is illustrated in FIG. 17. In FIG. 18, another example of the circuit configuration of the buffer unit 35 is illustrated.

As illustrated in FIG. 18, the bias circuit 80 includes the constant electric current source Ia and the NMOS transistor 71c. The NMOS transistor 71c is an oxide semiconductor TFT.

The output buffer circuit 90 includes the first and second PMOS transistor 91p and 92p and first, second, and third NMOS transistors 93c, 94c, and 72c. Each of the first and second PMOS transistors 91p and 92p is a polycrystalline silicon TFT. Each of the first, second, and third NMOS transistor 93c, 94c, and 72c is an oxide semiconductor TFT.

The drain electrode and the gate electrode of the NMOS transistor 71c of the bias circuit 80 and the gate electrode of the third NMOS transistor 72c of the output buffer circuit 90 are connected to each other. Furthermore, the source electrode of the NMOS transistor 71c and the source electrode of the third NMOS transistor 72c are connected to the low electric potential side power source VSS. The constant electric current source Ia is provided between the drain electrode of the NMOS transistor 71c and the high electric potential side power source VDD, and constant electric current flows from the high electric potential side power source VDD in a direction toward the drain electrode of the NMOS transistor 71c.

The gate electrode of the first NMOS transistor 93c of the output buffer circuit 90 and the gate electrode of the second NMOS transistor 94c are connected to the two input terminals of the output buffer circuit 90. One of the two input terminals is connected to the DAC 34, and the other is short-circuited to the output terminal of the output buffer circuit 90.

The drain electrode of the third NMOS transistor 72c, a source electrode of the first NMOS transistor 93c, and a source electrode of the second NMOS transistor 94c are connected to each other. Furthermore, a drain electrode of the first NMOS transistor 93c, the drain electrode and the gate electrode of the first PMOS transistor 91p, and the gate electrode of the second PMOS transistor 92p are connected to each other. Moreover, a drain electrode of the second NMOS transistor 94c and the drain electrode of the second PMOS transistor 92p are connected to the output terminal of the output buffer circuit 90.

A source wiring line is connected to the output terminal of the output buffer circuit 90. Furthermore, the source electrode of the first PMOS transistor 91p and the source electrode of the second PMOS transistor 92p are connected to the high electric potential side power source VDD.

In the buffer unit 35 that is illustrated in FIG. 18, the NMOS transistor 71c of the bias circuit 80 and the third NMOS transistor 72c of the output buffer circuit 90 function as the current mirror circuit 70. When an analog signal from the DAC 34 is input into one (an input terminal that is not short-circuited to the output terminal) of the two input terminals of the output buffer circuit 90, electric current flows from the output terminal to the source wiring line, or the source wiring line to the output terminal in such a manner that the output terminal of the output buffer circuit 90 is at the same electric potential as the analog signal. For this reason, an analog signal voltage can be written on each pixel through the source wiring line.

As described above, in the buffer unit 35 that is illustrated in FIG. 18, connection portions (the NMOS transistor 71c and the third NMOS transistor 72c) of the bias circuit 80 and the output buffer circuit 90 constitute the current mirror circuit 70. In other words, the current mirror circuit 70 is positioned over the bias circuit 80 and the output buffer circuit 90. Because the oxide semiconductor TFTs 71c and 72c are used in the current mirror circuit 70, the variation in element characteristic between the TFTs 71c and 72c that constitute the current mirror circuit 70 is suppressed. For this reason, the precision of output is improved. Furthermore, because the current mirror circuit 70 is made up of two oxide semiconductor TFTs, TFTs 71c and 72c (more precisely, the number of elements is 2), the circuit scale can be decreased. For this reason, the low power consumption and the frame narrowing of the active matrix substrate (consequently, of the display device that includes the active matrix substrate) can be realized. Furthermore, the yield is also improved.

Figure 19:
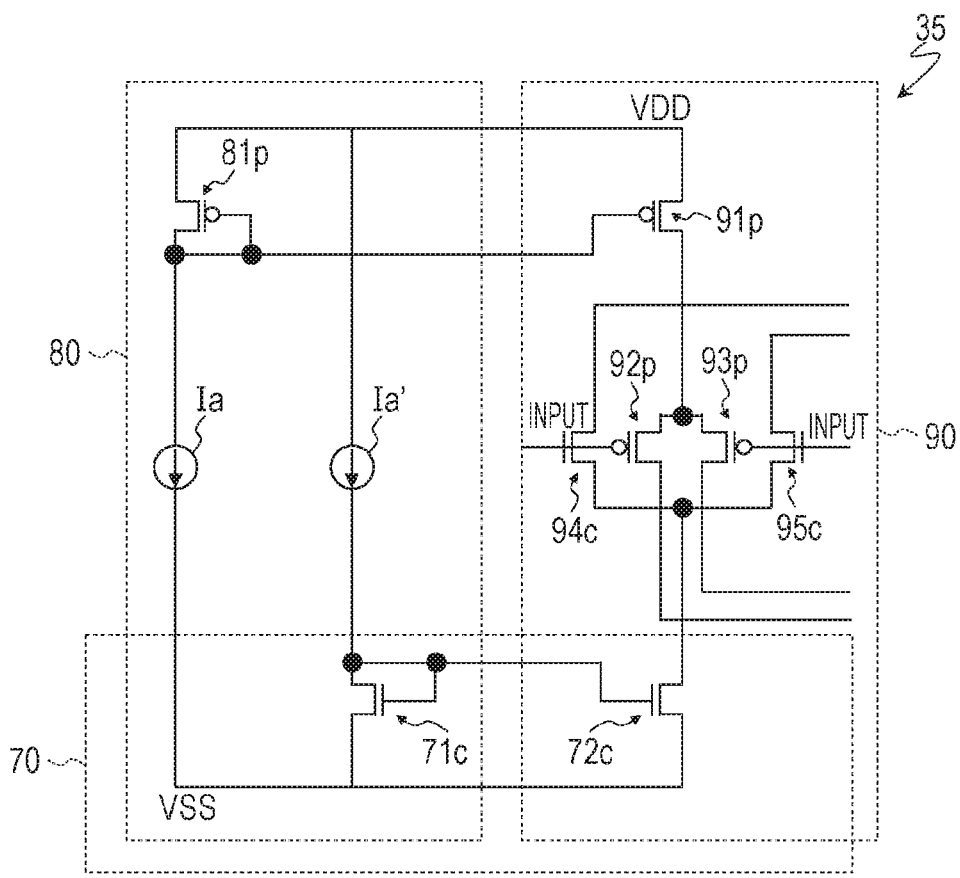
FIG. 19 is a circuit diagram illustrating another example of the buffer unit 35.

FIG. 19 illustrates another example of a circuit configuration of the buffer unit 35.

As illustrated in FIG. 19, the bias circuit 80 includes the constant electric current sources Ia and Ia', the PMOS transistor 81p, and the NMOS transistor 71c. The PMOS transistor 81p is a polycrystalline silicon TFT, and the NMOS transistor 71c is an oxide semiconductor TFT.

The output buffer circuit 90 includes the first, second, and third PMOS transistors 91p, 92p, and 93p, and the first, second, and third NMOS transistor 94c, 95c, and 72c. Each of the first, second, and third PMOS transistors 91p, 92p, and 93p is a polycrystalline silicon TFT. Each of the first, second, and third NMOS transistors 94c, 95c, and 72c is an oxide semiconductor TFT.

The drain electrode and the gate electrode of the PMOS transistor 81p of the bias circuit 80, and the gate electrode of the first PMOS transistor 91p of the output buffer circuit 90 are connected to each other. Furthermore, the source electrode of the PMOS transistor 81p and the source electrode of the first PMOS transistor 91p are connected to the high electric potential side power source VDD. The constant electric current source Ia is provided between the drain electrode of the PMOS transistor 81p and the low electric potential side power source VSS, and constant electric current flows from the drain electrode of the PMOS transistor 81p in a direction toward the low electric potential side power source VSS.

The drain electrode and the gate electrode of the NMOS transistor 71c of the bias circuit 80 and the gate electrode of the third NMOS transistor 72c of the output buffer circuit 90 are connected to each other. Furthermore, the source electrode of the NMOS transistor 71c and the source electrode of the third NMOS transistor 72c are connected to the low electric potential side power source VSS. A constant electric current source Ia' is provided between the drain electrode of the NMOS transistor 71c and the high electric potential side power source VDD, and constant electric current flows from the high electric potential side power source VDD in a direction toward the drain electrode of the NMOS transistor 71c.

The drain electrode of the third NMOS transistor 72c, a source electrode of a first NMOS transistor 94c, and a source electrode of a second NMOS transistor 95c are connected to each other. Furthermore, the drain electrode of the first PMOS transistor 91p, and the source electrode of the second PMOS transistor 92p, and the source electrode of the third PMOS transistor 93p are connected to each other.

The gate electrode of the second PMOS transistor 92p of the output buffer circuit 90 and a gate electrode of the first NMOS transistor 94c are connected to one of the two input terminals of the output buffer circuit 90.

Furthermore, the gate electrode of the third PMOS transistor 93p and a gate electrode of the second NMOS transistor 95c are connected to the other of the two input terminals of the output buffer circuit 90. One of the two input terminals of the output buffer circuit 90 is connected to the DAC 34, and the other is short-circuited to the output terminal of the output buffer circuit 90.

In the buffer unit 35 that is illustrated in FIG. 19, the NMOS transistor 71c of the bias circuit 80 and the third NMOS transistor 72c of the output buffer circuit 90 function as the current mirror circuit 70. When an analog signal from the DAC 34 is input into one (an input terminal that is not short-circuited to the output terminal) of the two input terminals of the output buffer circuit 90, electric current flows from the output terminal to the source wiring line, or the source wiring line to the output terminal in such a manner that the output terminal of the output buffer circuit 90 is at the same electric potential as the analog signal. For this reason, an analog signal voltage can be written on each pixel through the source wiring line.

As described above, in the buffer unit 35 that is illustrated in FIG. 19, the connection portions (the NMOS transistor 71c and the third NMOS transistor 72c) of the bias circuit 80 and the output buffer circuit 90 constitute the current mirror circuit 70. In other words, the current mirror circuit 70 is positioned over the bias circuit 80 and the output buffer circuit 90. Because the oxide semiconductor TFTs 71c and 72c are used in the current mirror circuit 70, the variation in element characteristic between the TFTs 71c and 72c that constitute the current mirror circuit 70 is suppressed. For this reason, the precision of output is improved. Furthermore, because the current mirror circuit 70 is made up of two oxide semiconductor TFTs, the TFTs 71c and 72c (more precisely, the number of elements is 2), the circuit scale can be decreased. For this reason, the low power consumption and the frame narrowing of the active matrix substrate (consequently, of the display device that includes the active matrix substrate) can be realized. Furthermore, the yield is also improved.

(TFT Structure and Oxide Semiconductor) As already described, each of the active matrix substrates according to the first to fourth embodiments includes an oxide semiconductor TFT and a polycrystalline silicon TFT that are formed on the same substrate.

Figure 20:
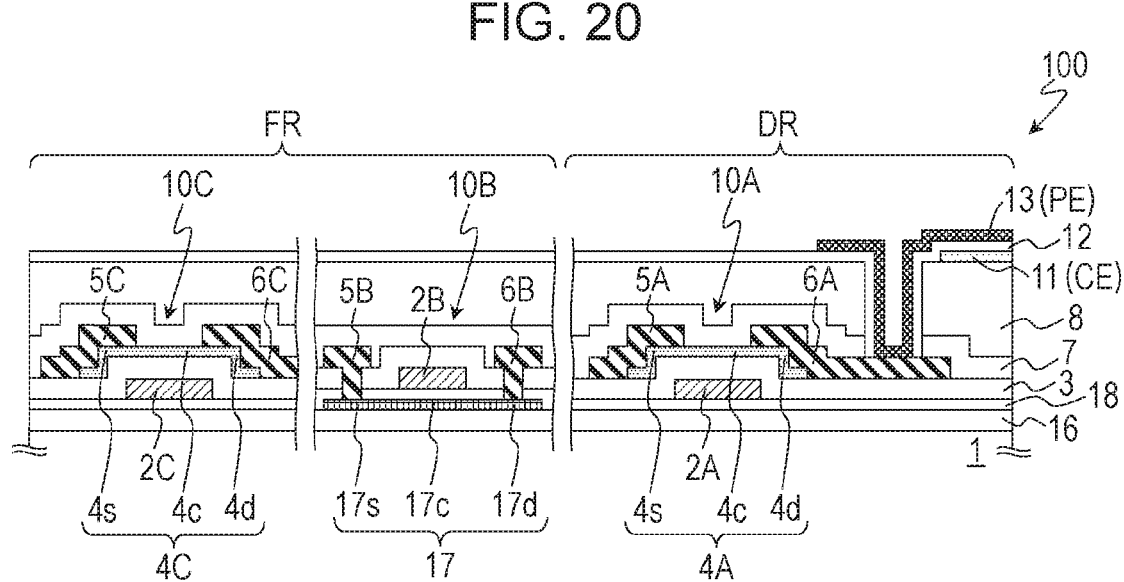
FIG. 20 is a cross-sectional diagram that schematically illustrates the active matrix substrate 100 according to the embodiment of the present invention.

In FIG. 20, an example of a cross-sectional structure of each of the active matrix substrates according to the first to fourth embodiments. The active matrix substrate 100 that is illustrated in FIG. 20 includes a pixel TFT 10A, a first circuit TFT 10B, and a second circuit TFT 10C. The pixel TFT 10A is an oxide semiconductor TFT that is formed in the display area DR. The first circuit TFT 10B is a polycrystalline silicon TFT that is formed in the non-display area FR. The second circuit TFT 10C is an oxide semiconductor TFT in the non-display area FR. For example, in a TFT that has the level shifter circuit 50 which that is illustrated in FIG. 9, the first and second PMOS transistors 51p and 52p correspond to the first circuit TFT 10B, and the first and second NMOS transistors 71c and 72c correspond to the second circuit TFT 10C.

The active matrix substrate 100, as illustrated in FIG. 20, includes the substrate 1, a base film 16 that is formed on a surface of the substrate 1, the pixel TFT 10A that is formed on the base film 16, the first circuit TFT 10B, and the second circuit TFT 10C. The first circuit TFT 10B has an activation region that primarily contains polycrystalline silicon. The second circuit TFT 10C and the pixel TFT 10A each have an activation region that primarily contains oxide semiconductor. The first circuit TFT 10B, the second circuit TFT 10C, and the pixel TFT 10A are integrally formed on the substrate 1. The "activation region" is assumed to refer to a region in which a channel is formed, of the semiconductor layer that is the activation layer of the TFT.

The first circuit TFT 10B has a polycrystalline silicon semiconductor layer 17 that is formed on the base film 16, a lower insulating layer 18 that covers the polycrystalline silicon semiconductor layer 17, and a gate electrode 2B that is provided on the lower insulating layer 18. A portion of the lower insulating layer 18, which is positioned between the polycrystalline silicon semiconductor layer 17 and the gate electrode 2B functions as a gate insulating film of the first circuit TFT 10B. The polycrystalline silicon semiconductor layer 17 has a region (activation region) 17c in which a channel is formed, and a source region 17s and a drain region 17d that are positioned to both the sides, respectively, of the activation region. In this example, a portion of the polycrystalline silicon semiconductor layer 17, which overlaps the gate electrode 2B with the lower insulating layer 18 in between, is an activation region 17c. The first circuit TFT 10B further has a source electrode 5B and a drain electrode 6B that are connected to a source region 17s and a drain region 17d, respectively. The source and drain electrodes 5B and 6B may be provided on an inter-layer insulating film (here the gate insulating layer 3) that covers the gate electrode 2B and the polycrystalline silicon semiconductor layer 17 and may be connected to the polycrystalline silicon semiconductor layer 17 within a contact hole that is formed in the inter-layer insulating film.

The second circuit TFT 10C has a gate electrode 2C that is provided on the base film 16, a gate insulating layer 3 that covers the gate electrode 2C, and an oxide semiconductor layer 4C that is positioned on the gate insulating layer 3. As illustrated, the lower insulating layer 18 that is the gate insulating film of the first circuit TFT 10B may also be formed in an area in which the second circuit TFT 10C is formed. The oxide semiconductor layer 4C has a region (activation region) 4c in which a channel is formed, and a source contact area 4s and a drain contact area 4d that are positioned to both the sides, respectively, of the activation region. In this example, a portion of an oxide semiconductor layer 4C, which overlaps the gate electrode 2C with the gate insulating layer 3 in between, is an activation region 4c. Furthermore, the second circuit TFT 10C further has a source electrode 5C and a drain electrode 6C that are connected to the source contact area 4s and the drain contact area 4d, respectively.

The pixel TFT 10A has a gate electrode 2A that is provided on the base film 16, the gate insulating layer 3 that covers the gate electrode 2A, and an oxide semiconductor layer 4A that is positioned on the gate insulating layer 3. As illustrated, the lower insulating layer 18 that is the gate insulating film of the first circuit TFT 10B may extend up to an area in which the pixel TFT 10A is formed. The oxide semiconductor layer 4A has the region (activation region) 4c in which a channel is formed, the source contact area 4s and the drain contact area 4d that positioned to both the sides, respectively, of the activation region. In this example, a portion of an oxide semiconductor layer 4A, which overlaps the gate electrode 2A with the gate insulating layer 3 in between, is the activation region 4c. Furthermore, the pixel TFT 10A further has a source electrode 5A and a drain electrode 6A that are connected to the source contact area 4s and the drain contact area 4d, respectively. It is noted that a configuration in which the base film 16 is not provided on the substrate 1 is also possible.

The first circuit TFT 10B, the second circuit TFT 10A, and the pixel TFT 10C are covered with an inorganic insulating layer (a protection film) 7 and an organic insulating layer (a flattening film) 8. In the pixel TFT 10A, the gate electrode 2A is connected to a gate wiring line (not illustrated), the source electrode 5A to a source wiring line (not illustrated), and the drain electrode 6A to the pixel electrode PE. In this example, the drain electrode 6A is connected to a corresponding pixel electrode PE within an opening portion that is formed in the inorganic insulating layer 7 and the organic insulating layer 8. A display signal is supplied to the source electrode 5A through a source wiring line, and necessary electric charge is written to the pixel electrode PE based on a scanning signal from a gate wiring line.

It is noted that, as illustrated, the lower transparent electrode 11 may be formed, as the common electrode CE, on the organic insulating layer 8 and that the dielectric layer 12 may be formed between the common electrode CE (the lower transparent electrode 11) and the pixel electrode PE (the upper transparent electrode 13). In this case, an opening in the shape of a slit may be provided in the pixel electrode PE. The active matrix substrate 100, for example, can find application in liquid display devices that operate in a Fringe Field Switching (FFS) Mode. The FFS mode is a mode in compliance with a transverse electric field method in which a pair of electrodes is provided on one substrate and in which an electric field is applied, in a direction (in the horizontal direction) in parallel to a surface of the substrate, to liquid crystal molecules. In this example, an electric field is generated that is expressed as a line of electric force which gets out of the pixel electrode PE, passes through a liquid crystal layer (not illustrated) and further through an opening in the shape of a slit in the pixel electrode PE, and gets to the common electrode CE. The electric field has a component in the horizontal direction with respect to the liquid crystal layer. As a result, the electric field in the horizontal direction can be applied to the liquid crystal layer. In a transverse electric field method, a liquid crystal molecule does not rise up from the substrate. Because of this, there is an advantage that the transverse electric field method can realize a wider viewing angle than a vertical-direction electric field method.

In an example that is illustrated, the first circuit TFT 10B has a top gate structure in which the polycrystalline silicon semiconductor layer 17 is positioned between the gate electrode 2B and the substrate 1 (the base film 16). On the other hand, the second circuit TFT 10C and the pixel TFT 10A have bottom gate structures, respectively, in which the gate electrodes 2C and 2A are arranged between the oxide semiconductor layer 4C and the substrate 1 (the base film 16) and between the oxide semiconductor layer 4A and the substrate 1, respectively. By employing these structures, it is possible that an increase in the number of manufacturing processes or in manufacturing cost is effectively suppressed when two types of TFTs (a polycrystalline silicon TFT and an oxide semiconductor TFT) are integrally formed on the same substrate 1.

TFT structures of the first circuit TFT 10B, the second circuit TFT 10C, and the pixel TFT 10A are not limited to those described above. For example, the first circuit TFT 10B, the second circuit TFT 10C, and the pixel TFT 10A may have the same TFT structure. Alternatively, the first circuit TFT 10B may have the bottom gate structure, and the second circuit TFT 10C and the pixel TFT 10A may have the top gate structure. Furthermore, in the case of the bottom gate structure, a channel type, as illustrated, may be available, and an etch type may be available.

The gate insulating layer 3 that is gate insulating films of the second circuit TFT 10C and the pixel TFT 10A may extend up to an area in which the first circuit TFT 10B is formed and may function as an inter-layer insulating film that covers the gate electrode 2B and the polycrystalline silicon semiconductor layer 17 of the first circuit TFT 10B. In a case where the inter-layer insulating film of the first circuit TFT 10B and the gate insulating films of the second circuit TFT 10C and the pixel TFT 10A are formed in this manner within the same layer (the gate insulating layer) 3, the gate insulating layer 3 may have a multi-layered structure.

The gate electrode 2B of the first circuit TFT 10B, the gate electrodes 2C of the second circuit TFT 10C, the gate electrode 2A of the pixel TFT 10A may be formed within the same layer. Furthermore, the source and drain electrodes 5B and 6B of the first circuit TFT 10B, the source and drain electrodes 5C and 6C of the second circuit TFT 10C, and the source and drain electrodes 5A and 6A of the pixel TFT 10A may be formed within the same layer. The expression "electrodes are formed within the same layer" means that electrodes are formed using the same film (the conductive film). Accordingly, the increase in the number of manufacturing processes and in the manufacturing cost can be suppressed.

The oxide semiconductor layers 4A and 4C each, for example, contains a semiconductor based on In—Ga—Zn—O (hereinafter referred to as "In—Ga—Zn—O-based semiconductor"). The In—Ga—Zn—O-based semiconductor here is a ternary oxide material that consists of Indium (In), Gallium (Ga), and Zinc (Zn). A ratio (a composition ratio) among In, Ga, and Zn is not particularly limited. Examples of the ratio include In:Ga:Zn=2:2:1, In:Ga:Zn=1:1:1, In:Ga:Zn=1:1:2, and the like.

A TFT that has an In—Ga—Zn—O-based semiconductor layer has high mobility (20 times or more than that of an a-Si TFT) and a small amount of leakage electric current (less than one hundred of that of the a-Si TFT), and, because of this, is used suitably as a drive TFT and a pixel TFT. If the TFT that has the In—Ga—Zn—O-based semiconductor layer is used, it is possible that power consumed by the display device is greatly reduced.

The In—Ga—Zn—O-based semiconductor may be amorphous and may be crystalline. A crystalline in-Ga—Zn—O-based semiconductor in which a c-axis aligns approximately vertically with a layer surface is preferable as a crystalline In—Ga—Zn—O-based semiconductor. A crystalline structure of the In—Ga—Zn—O-based semiconductor, for example, is disclosed in Japanese Unexamined Patent Application Publication No. 2012-134475. For reference, the entire contents of Japanese Unexamined Patent Application Publication No. 2012-134475 are incorporated in the present specification by reference.

The oxide semiconductor layers 4A and 4C may contain any other oxide semiconductor instead of the In—Ga—Zn—O-based semiconductor. For example, a Zn—O-based semiconductor (ZnO), an In—Zn—O-based semiconductor (IZO (a registered trademark)), a Zn—Ti—O-based semiconductor (ZTO), a Cd—Ge—O-based semiconductor, a Cd—Pb—O-based semiconductor, oxide cadmium (CdO), a Mg—Zn—O-based semiconductor, an In—Sn—Zn—O-based semiconductor (for example, $In_2O_3$—$SnO_2$—ZnO), an In—Ga—Sn—O-based semiconductor, or the like may be contained.

Other Embodiments

The case where the current mirror circuit 70 generates and output an output voltage $I_{out}$ of which a magnitude is substantially the same as that of the reference voltage $I_{ref}$ has so far been described as an example, but the embodiments of the present invention are not limited to this. For example, two oxide semiconductor TFTs, the TFTs 71c and 72c that constitute the current mirror circuit 70 are caused to differ in channel size, and thus the output voltage $I_{out}$ that has a different magnitude than the reference voltage $I_{ref}$ can be generated and output.

Furthermore, the configuration in which one of the gate driver and the source driver is a monolithic driver has so far been described as an example, but both the gate driver and the source driver may be monolithic drivers.

At least a portion of the monolithic driver may be positioned within the display area DR. By employing this configuration, the non-display area FR can be further decreased (further frame-narrowing can be achieved). A configuration in which at least a portion of the monolithic driver is positioned in the display area DR, for example, is disclosed in International Publication No. 2014/069529. For reference, the entire contents of International Publication No. 2014/069529 are incorporated in the present specification by reference.

Furthermore, the case where the active matrix substrate includes both an oxide semiconductor TFT and a polycrystalline silicon TFT has so far been described, but the embodiments of the present invention are not limited to this. The active matrix substrate may include only an oxide semiconductor TFT as a TFT.

The active matrix substrate according to the embodiment of the present invention is used suitably in display devices. The liquid display device can include an active matrix substrate according to the embodiment of the present invention, an opposite substrate that is positioned in such a manner as to face the active matrix substrate, and a display medium layer that is provided between the active matrix substrate and the opposite substrate. It is noted that the active matrix substrate of the liquid crystal display device that performs display in a transverse electric field mode such as the FFS mode has so far been described as an example, but can also find application as an active matrix substrate of a liquid crystal display device that performs display in a vertical electric field mode (for example, a TN mode or a vertical alignment mode) in which a voltage is applied in the direction of the thickness of the liquid crystal layer. Furthermore, the active matrix substrate according to the present invention is also suitably used in a display device (a display device that includes a display medium layer other than the liquid crystal layer) other than the liquid crystal display device.

INDUSTRIAL APPLICABILITY

According to the embodiment of the present invention, the precision of the output of the current mirror circuit that the drive circuit in the active matrix substrate has can be improved while suppressing the increase in the number of circuit elements.

REFERENCE SIGNS LIST

1 SUBSTRATE
2, 2A, 2B, 2C GATE ELECTRODE
3 GATE INSULATING LAYER
4, 4A, 4C OXIDE SEMICONDUCTOR LAYER
5, 5A, 5B, 5C SOURCE ELECTRODE
6, 6A, 6B, 6C DRAIN ELECTRODE
7 INORGANIC INSULATING LAYER
8 ORGANIC INSULATING LAYER
9 INTER-LAYER INSULATING LAYER
10, 10A PIXEL TFT
10B FIRST CIRCUIT TFT
10C SECOND CIRCUIT TFT
11 LOWER TRANSPARENT ELECTRODE
12 DIELECTRIC LAYER
13 UPPER TRANSPARENT ELECTRODE
16 BASE FILM
17 POLYCRYSTALLINE SILICON SEMICONDUCTOR LAYER
18 LOWER INSULATING LAYER
20 GATE DRIVER
30 SOURCE DRIVER
31 SHIFT REGISTER CIRCUIT
32 SAMPLING LATCH CIRCUIT
33 HOLD LATCH CIRCUIT
34 DAC
35 BUFFER UNIT
40 SHIFT REGISTER CIRCUIT
41 FIRST CLOCK INVERTER
42 SECOND CLOCK INVERTER
43 INVERTER
50 LEVEL SHIFTER CIRCUIT
60 OUTPUT BUFFER CIRCUIT
70 CURRENT MIRROR CIRCUIT
71C, 72C OXIDE SEMICONDUCTOR TFT
80 BIAS CIRCUIT
90 OUTPUT BUFFER CIRCUIT
100 ACTIVE MATRIX SUBSTRATE
DR DISPLAY AREA
FR NON-DISPLAY AREA
P PIXEL AREA (PIXEL)
GL GATE WIRING LINE
SL SOURCE WIRING LINE
PE PIXEL ELECTRODE
CE COMMON ELECTRODE

The invention claimed is:

1. An active matrix substrate that has a display area which includes multiple pixel areas and a non-display area which is positioned in the vicinity of the display area, the active matrix substrate comprising:

a substrate;

multiple pixel TFTs that are arranged in the multiple pixel areas, the multiple pixel TFTs being supported on the substrate;

multiple gate wiring lines along which a scanning signal is supplied to the multiple pixel TFTs;

multiple source wiring lines along which a display signal is supplied to the multiple pixel TFTs;

a gate driver that drives the multiple gate wiring lines; and a source driver that drives the multiple source wiring lines, wherein at least one of the gate driver and the source driver includes a current mirror circuit, wherein the current mirror circuit is configured with two oxide semiconductor TFTs each of which includes an oxide semiconductor layer, wherein the gate driver includes the current mirror circuit, wherein the gate driver includes a shift register circuit, a level shifter circuit, and an output buffer circuit, wherein the level shifter circuit includes the current mirror circuit, wherein each of the shift register circuit and the output buffer circuit includes multiple TFTs, wherein the level shifter circuit includes multiple PMOS transistors and multiple NMOS transistors, wherein each of the multiple TFTs of the shift register circuit and each of the multiple PMOS transistors of the level shifter circuit are polycrystalline silicon TFTs each of which includes a polycrystalline silicon semiconductor layer, and wherein each of the multiple NMOS transistors of the level shifter circuit and each of the multiple TFTs of the output buffer circuit are oxide semiconductor TFTs each of which includes an oxide semiconductor layer.

2. The active matrix substrate according to claim 1, wherein each of the two oxide semiconductor TFTs is an NMOS transistor.

3. An active matrix substrate that has a display area which includes multiple pixel areas and a non-display area which is positioned in the vicinity of the display area, the active matrix substrate comprising:

a substrate;
multiple pixel TFTs that are arranged in the multiple pixel areas, the multiple pixel TFTs being supported on the substrate;
multiple gate wiring lines along which a scanning signal is supplied to the multiple pixel TFTs;
multiple source wiring lines along which a display signal is supplied to the multiple pixel TFTs;
a gate driver that drives the multiple gate wiring lines; and
a source driver that drives the multiple source wiring lines,
wherein at least one of the gate driver and the source driver includes a current mirror circuit,
wherein the current mirror circuit is configured with two oxide semiconductor TFTs each of which includes an oxide semiconductor layer,
wherein the gate driver includes the current mirror circuit,
wherein the gate driver includes a shift register circuit, a level shifter circuit, and an output buffer circuit,
wherein the level shifter circuit includes the current mirror circuit,
wherein the gate driver includes multiple PMOS transistors and multiple NMOS transistors,
wherein each of the multiple PMOS transistors is a polycrystalline silicon TFT that includes a polycrystalline silicon semiconductor layer, and
wherein each of the multiple NMOS transistors is an oxide semiconductor TFT that includes an oxide semiconductor layer.

4. The active matrix substrate according to claim 1, wherein the gate driver is monolithically formed on the substrate.

5. An active matrix substrate that has a display area which includes multiple pixel areas and a non-display area which is positioned in the vicinity of the display area, the active matrix substrate comprising:
a substrate;
multiple pixel TFTs that are arranged in the multiple pixel areas, the multiple pixel TFTs being supported on the substrate;
multiple gate wiring lines along which a scanning signal is supplied to the multiple pixel TFTs;
multiple source wiring lines along which a display signal is supplied to the multiple pixel TFTs;
a gate driver that drives the multiple gate wiring lines; and
a source driver that drives the multiple source wiring lines,
wherein at least one of the gate driver and the source driver includes a current mirror circuit,
wherein the current mirror circuit is configured with two oxide semiconductor TFTs each of which includes an oxide semiconductor layer,
wherein the source driver includes the current mirror circuit,
wherein the source driver includes a buffer unit that includes a bias circuit and an output buffer circuit,
wherein the buffer unit includes the current mirror circuit,
wherein the buffer unit includes multiple PMOS transistors and multiple NMOS transistors,
wherein each of the multiple PMOS transistors is a polycrystalline silicon TFT that includes a polycrystalline silicon semiconductor layer, and
wherein each of the multiple NMOS transistors is an oxide semiconductor TFT that includes an oxide semiconductor layer.

6. The active matrix substrate according to claim 5, wherein the source driver is monolithically formed on the substrate.

7. The active matrix substrate according to claim 1, wherein each of the multiple pixel TFTs is an oxide semiconductor TFT that includes an oxide semiconductor layer.

8. The active matrix substrate according to claim 1, wherein the oxide semiconductor layer contains an In—Ga—Zn—O-based semiconductor.

9. A display device comprising:
the active matrix substrate according to claim 1;
an opposite substrate that is positioned in such a manner as to face the active matrix substrate; and
a display medium layer that is provided between the active matrix substrate and the opposite substrate.

10. The active matrix substrate according to claim 3, wherein each of the two oxide semiconductor TFTs is an NMOS transistor.

11. The active matrix substrate according to claim 3, wherein the gate driver is monolithically formed on the substrate.

12. The active matrix substrate according to claim 3, wherein each of the multiple pixel TFTs is an oxide semiconductor TFT that includes an oxide semiconductor layer.

13. The active matrix substrate according to claim 3, wherein the oxide semiconductor layer contains an In—Ga—Zn—O-based semiconductor.

14. A display device comprising:
the active matrix substrate according to claim 3;
an opposite substrate that is positioned in such a manner as to face the active matrix substrate; and
a display medium layer that is provided between the active matrix substrate and the opposite substrate.

15. The active matrix substrate according to claim 5, wherein each of the two oxide semiconductor TFTs is an NMOS transistor.

16. The active matrix substrate according to claim 5, wherein the gate driver includes the current mirror circuit.

17. The active matrix substrate according to claim 16, wherein the gate driver includes a shift register circuit, a level shifter circuit, and an output buffer circuit, and
wherein the level shifter circuit includes the current mirror circuit.

18. The active matrix substrate according to claim 16, wherein the gate driver is monolithically formed on the substrate.

19. The active matrix substrate according to claim 5, wherein each of the multiple pixel TFTs is an oxide semiconductor TFT that includes an oxide semiconductor layer.

20. The active matrix substrate according to claim 5, wherein the oxide semiconductor layer contains an In—Ga—Zn—O-based semiconductor.

* * * * *